United States Patent
Blume

(10) Patent No.: US 7,641,175 B1
(45) Date of Patent: Jan. 5, 2010

(54) VALVE BODY AND SEAL

(76) Inventor: George H. Blume, 107 Morning Cloud Cove, Austin, TX (US) 78734

( * ) Notice: Subject to any disclaimer, the term of this patent is extended or adjusted under 35 U.S.C. 154(b) by 368 days.

(21) Appl. No.: 11/737,774

(22) Filed: Apr. 20, 2007

Related U.S. Application Data

(63) Continuation-in-part of application No. 11/229,221, filed on Sep. 16, 2005, now Pat. No. 7,222,837, which is a continuation-in-part of application No. 10/715,043, filed on Nov. 17, 2003, now Pat. No. 6,955,339, which is a continuation-in-part of application No. 10/223,304, filed on Aug. 19, 2002, now Pat. No. 6,679,477, which is a continuation-in-part of application No. 09/835,986, filed on Apr. 16, 2001, now Pat. No. 6,435,475.

(51) Int. Cl.
*F16K 39/00* (2006.01)
(52) U.S. Cl. .............. 251/282; 251/332; 251/333; 137/516.29
(58) Field of Classification Search ......... 251/281, 251/282, 318, 332, 333, 358; 137/516.29
See application file for complete search history.

(56) References Cited

U.S. PATENT DOCUMENTS

| | | | |
|---|---|---|---|
| 2,435,948 A | 2/1948 | Wischhusen | |
| 2,627,259 A | 2/1953 | Wood et al. | |
| 3,433,250 A * | 3/1969 | Hagihara | 137/469 |
| 4,518,329 A | 5/1985 | Weaver | |
| 5,253,987 A | 10/1993 | Harrison | |
| 5,345,965 A * | 9/1994 | Blume | 137/533.25 |
| 5,931,474 A | 8/1999 | Chang et al. | |

* cited by examiner

*Primary Examiner*—John K Fristoe, Jr.
(74) *Attorney, Agent, or Firm*—Dennis W. Gilstad

(57) ABSTRACT

A valve body substantially symmetrical about a longitudinal axis has at least one internal space and comprises guide means and two separately formed portions joined by at least one cylindrical web. One or more passages spaced apart from the longitudinal axis allow fluid communication between at least one internal space and space external to the valve body. At least one internal space may be substantially filled with a substantially incompressible flowable substance to facilitate pressure equalization across the valve body. Forging or casting valve body portions to near-net-shape prior to joining minimizes machining necessary to achieve a final desired shape. Increased valve durability and reduced metal wear arise from reduced valve body weight and correspondingly reduced impact loading as the valve body moves to seal against a valve seat. Valve sealing may be aided by an elastomeric seal in a peripheral integral seal retention groove of the valve body.

14 Claims, 29 Drawing Sheets

VALVE BODY AND SEAL

This is a continuation-in-part (CIP) patent application of U.S. Ser. No. 11/229,221, which was filed 16 Sep. 2005, which was a CIP patent application of U.S. Ser. No. 10/715, 043, which was filed 17 Nov. 2003 (now U.S. Pat. No. 6,955, 339 B1 issued 18 Oct. 2005), which was a CIP patent application of U.S. Ser. No. 10/223,304, which was filed 19 Aug. 2002 (now U.S. Pat. No. 6,679,477 B1 issued 20 Jan. 2004), which was a CIP patent application of U.S. Ser. No. 09/835, 986, which was filed 16 Apr. 2001 (now U.S. Pat. No. 6,435, 475 B1 issued 20 Aug. 2002).

FIELD OF THE INVENTION

The invention relates generally to valves and valve components.

BACKGROUND

A valve suitable for fluids encountered in oil field operations (e.g., drilling mud) may comprise a valve body, a corresponding valve seat, and an elastomeric seal internal to a peripheral seal retention groove on the valve body. Such a valve may be mounted in the fluid end of a pump incorporating positive displacement pistons or plungers in multiple cylinders. Valve bodies of such valves move longitudinally between an open position (i.e., the valve body not contacting the valve seat) and a closed position (i.e., the valve body sealed against the valve seat). During such movement the valve body is typically guided to insure that a consistently effective seal may be repeatedly obtained against the valve seat.

Guide means for thus guiding the valve body take a variety of forms typically involving one or more structures extending from the bottom and/or top of the valve body. Note that a reference herein to the bottom or bottom portion of a valve body pertains to that portion comprising a surface intended for intermittent contact with a valve seat. The top or top portion of a valve body is longitudinally opposite the bottom or bottom portion. Examples of guide means include a stem-guided, full-open valve body design that incorporates a top guide stem and a bottom crow-foot guide on the valve body. On the other hand, a web-seat, stem-guided design incorporates top and bottom guide stems on the valve body. Other valve body designs may include guide means comprising, for example, a single top guide stem or a single bottom crow-foot guide. Guide means discussed herein typically comprise at least one longitudinal surface for guiding longitudinal valve body movement. Each such longitudinal surface may be continuous (e.g., the cylindrical surface of a guide stem) or discontinuous (e.g., the plurality of spaced-apart longitudinal surfaces present in a crow-foot guide).

However designed, the above valves are expensive to manufacture, especially the moving portion or valve body. Besides requiring finish machining to close tolerances for adequate sealing, such valve bodies must be made strong enough to resist significant distortion under load, which can result in leaks and/or fatigue failures of the valve body. Prior efforts to reduce distortion under load by strengthening such valve bodies have generally resulted in higher cost and/or heavier designs which exacerbate sealing problems and/or increase the stress of impact loading on components of the valve assembly.

Notwithstanding their relatively high cost, however, valve bodies having an integral seal retention groove have gained limited industry acceptance. Their relatively high strength and stiffness effectively counter valve body distortion about one or more axes radiating perpendicularly from the valve body's longitudinal axis of symmetry (radial axes). Distortion about radial axes is particularly a problem on valve bodies that mate with web seats. Cyclical high pressure applied to a valve body when it is sealed against a web seat tends to repeatedly force portions of the valve body into the spaces between the seat webs. The periphery of the disc-shaped area of the valve body (commonly called the flange) then tends to wrinkle like a cupcake paper, the number of wrinkles being equal to the number of seat webs.

While tending to resist distortion about radial axes, valve bodies having an integral seal retention groove generally incorporate an elastomeric seal insert that snaps into its peripheral seal retention groove. A typical "snap-on" seal insert comprises a portion of a toroidal structure such as a plastic or rubber ring that is sized to fit tightly, and thus sealingly, in the peripheral seal retention groove. When properly fitted, the elastomeric seal mates tightly with a corresponding valve seat even though the valve body may be slightly distorted and even if small particles carried by the pumped fluid may be trapped between sealing surfaces. Practical advantages of such a seal insert include extended valve life and improved valve performance, but proper fitting and sealing of the elastomeric ring on a valve body is often difficult in the field.

Some of the above problems associated with high machining and materials costs for the above valves, as well as those associated with seal movement and/or out-of-round seal placement, are reduced in valve bodies which incorporate a separate (removable) seal retention plate which commonly screws or bolts to the valve body to form at least part of one wall of a seal retention groove. Separate seal retention plates can be forged to near-net-shape, and they reduce the time required to correctly replace toroidal sealing rings. But they also raise valve fabrication costs and impose use restrictions. For example, they add excess weight to the moving valve body, aggravating impact loading stress. And a removable seal retention plate must be handled separately from the remainder of the valve body during manufacturing. Additionally, special skills and tools are required for proper assembly of a retention plate and seal ring on a valve body. Finally, the threads often used to secure a retention plate to a valve body are both expensive to machine and, because portions of the threads are relatively thin, they demand special protection during heat treatment. Nevertheless, removable seal retention plates are commonly used because such a plate, as well as the valve body to which it is attached in use, can be forged to a "near-net-shape" which requires relatively little finish machining to achieve a desired final shape.

Unfortunately then, even though forged valve bodies having integral seal retention groves are inherently stronger than designs requiring a removable seal retention plate, they are generally heavier, more expensive to make, and prone to failure due to seal movement and/or out-of-round seals. What is needed is a valve body having an integral seal retention groove without the disadvantages of high production costs, excessive weight, seal movement and/or out-of-round seal placement.

Attempts to overcome the cost disadvantage of forged valve bodies having integral seal retention grooves have included elimination of forgings altogether, substituting cast valve bodies instead. Though such castings may be produced to near-net-shape and thereby reduce machining costs, the generally higher cost of the casting process itself, compared to forging, has substantially eliminated any hoped-for reduction in overall cost. Additionally, cast valve bodies generally have lower impact strength compared to similarly shaped forgings. Thus, there is a need for a relatively light weight forged valve body incorporating the strength advantages of an integral seal retention groove and the efficiencies of initial formation to near-net-shape.

SUMMARY

The invention relates to valves, valve bodies, and valve body and seal assemblies. Embodiments incorporate combinations comprising guide means for a valve body, valve bodies substantially or totally enclosing at least one space or hollow, and at least one peripheral integral seal retention groove with or without peripheral seal(s). Such valve bodies are relatively stiff for their weight, resisting distortion about radial axes.

Certain embodiments of valve bodies and valve body and seal assemblies schematically illustrated herein comprise top and bottom valve body portions substantially symmetrical about a longitudinal axis. In these embodiments at least one cylindrical web is formed by welding the top valve body portion to the bottom valve body portion, each cylindrical web being radially spaced apart from and symmetrically disposed about the longitudinal axis. Each cylindrical web peripherally encloses a space internal to the valve body. In selected embodiments, at least one fluid passage is incorporated in at least one valve body portion, each fluid passage facilitating fluid communication between one or more spaces internal to the valve body and space external to the valve body.

A peripheral seal retention groove is formed by peripheral portions of the top and bottom valve body portions and the cylindrical web. Welding flash may protrude into the peripheral seal retention groove in certain embodiments, and an elastomeric seal may be located (e.g., cast-in-place or snapped into place) in the seal retention groove. Such an elastomeric seal may contact the welding flash (if the welding flash is present).

Thus, one or more spaces internal to the valve body may be totally enclosed (i.e., sealed), and/or one or more such spaces may be substantially enclosed while communicating with space external to the valve body via the above-described fluid passage(s). Further, space(s) internal to the valve body may be substantially occupied by a flowable substance that is substantially incompressible. The term flowable substance refers herein to a substance which may substantially conform to changes in the shape of its container and/or otherwise behave in a fluid-like manner under pressures encountered in certain applications. For example, relatively rigid polymers (e.g., urethane) such as those used in high-pressure valve seals may exhibit fluid-like behavior under high pumped-fluid pressures (e.g., 15,000 psi). Under such conditions, hydraulic transmission of applied pressures (i.e., fluid communication) via such flowable substances may occur.

Hydraulic transmission in the above applications implies that a substantially incompressible flowable substance that fills one or more spaces internal to a valve body may substantially instantaneously transmit to all surfaces enclosing the space(s) any pressure external to the valve body that is applied to the flowable substance via a fluid passage (i.e., a passage that establishes and/or facilitates fluid communication) between space(s) internal to a valve body and space external to the valve body. Note that fluid pressures in space external to a valve body and seal assembly may vary widely. For example, dynamic pressure gradients may be associated with fluid flow past a valve body. And discharge fluid pressure (e.g., pressure acting substantially on a valve body top portion) may be substantially higher than suction fluid pressure (e.g., pressure acting substantially on a valve body bottom portion) when the valve is closed (e.g., when the valve body is sealed against a valve seat) during a pump pressure stroke.

In operation, the above fluid passages can therefore facilitate equalization of large differential pressures that would otherwise tend to compress or expand space internal to a valve body. For example, rapidly rising pressures external to a valve body top portion during a pump pressure stroke may be substantially balanced (i.e., effectively counteracted) by nearly simultaneously rising pressures internal to the valve body. Near-simultaneity of pressure balance is facilitated by the nearly instantaneous hydraulic pressure transmission that occurs via a substantially incompressible flowable substance.

Note that such hydraulic pressure transmission may cause little or no measurable bulk flow of a substantially incompressible flowable substance. Since pressure balance between spaces internal and external to a valve body may thus be achieved with little or no bulk flow of flowable substance into or out of space(s) internal to the valve body, there may be little or no opportunity for mixing of pumped fluid and flowable substance within a valve body. With the composition of material internal to a valve body remaining substantially consistent over time, consistent performance of the valve body as a whole is facilitated. Note that in certain valve body embodiments, a variable portion of the desired instantaneous hydraulic pressure transmission described above may occur via one or more areas of a top valve body portion wherein slight flexing is allowed. Because of the substantial incompressibility of the flowable substance, relatively little such flexing may be needed to achieve a desired degree of instantaneous hydraulic pressure transmission. But even slight flexing may cause change in shape (i.e., flow) of the flowable substance (e.g., internally and/or through one or more fluid passages). Any such flow would be resisted as a function of the viscosity of the flowable substance, so small changes in valve body shape may then be viscously-damped by the flowable substance. Viscously damping, in turn, may dissipate impact energy without adversely affecting valve sealing.

Instantaneous hydraulic pressure transmission affects valve body performance measures such as resistance to distortion about radial axes. In valve body embodiments schematically illustrated herein, such resistance to distortion is increased by the presence of one or more cylindrical webs and the areas of top and bottom valve body portions which are spaced apart thereby. The presence of one or more spaces internal to such valve bodies makes them relatively lighter than valves with comparable distortion resistance but without internal spaces. Use of substantially incompressible flowable substance(s) to substantially fill these internal spaces helps maintain valve body structural integrity without the weight penalty experienced by solid-metal valves.

Separation of areas of top and bottom valve body portions, when combined with effective pressure equalization of internal space(s) as described herein, allows a degree of separation of valve body functions between the areas. For example, with reduction or elimination of large pressure gradients across much of a top valve body portion, the bottom valve body portion provides most of the valve body's resistance to the back pressure experienced by during a pump pressure stroke. The bottom valve body portion may be adapted to withstand this back pressure by, for example, forging it from relatively high-alloy steel. In contrast, the top valve body portion may be fabricated of relatively lower-alloy (and thus relatively less expensive) steel. Where beneficial properties of valve body materials, such as abrasion resistance and surface hardness, are intended to be distributed more equally between top and bottom portions, both top and bottom portions may comprise, for example, carburizing steel(s).

Flowable substances suitable for hydraulically transmitting equalizing pressures include, for example, polymers, liquids, gels and/or elastomers which tend to flow under high pressure (e.g., certain urethanes). Because the flowable substances are substantially incompressible and mass movements of the substances themselves are generally small, mixing of pumped fluids (e.g., drilling mud) with flowable substances in a fluid passage can be minimized by the use of one or more movable plugs in a fluid passage and/or by the use of relatively high-viscosity flowable substances either with or without movable plugs.

Relatively light-but-strong valve bodies useful in the above-described pressure-equalization applications comprise top and bottom valve body portions that are formed to near-net-shape before being joined. Typically, at least one valve body portion (e.g., the bottom portion) is formed by forging to impart toughness to the valve body. The other valve body portion may be formed by forging or casting. Investment casting is particularly useful for making a relatively thin-walled valve body portion or relatively complex shape. Joining of valve body portions can be by frictional welding (particularly inertia welding), but may be by any means of bonding the corresponding mating surfaces on the first and second portions, including electric arc welding or electron beam welding. Corresponding mating surfaces are substantially circular and have sufficient area to allow adequate strength to be developed across the mating surfaces when the portions are joined. Illustrated embodiments of corresponding mating surfaces include a substantially flat or conical washer-shaped circular mating surface on one portion (e.g., the top portion) which may be brought into substantial contact with a circular mating surface of similar size and complementary shape on the other portion (e.g., the bottom portion) to form a circular joint.

One valve body portion comprises a first disc-shaped body (called a first flange) having first and second opposing sides. The other valve body portion comprises a second disc-shaped body (called a second flange) having first and second opposing sides. In schematically illustrated embodiments, a top guide stem extends perpendicularly and symmetrically from the first flange's first opposing side (that is, along the respective longitudinal axis) and thus away from a circular mating surface that is symmetrically disposed about the respective longitudinal axis on the second opposing disc side.

The mating surface(s) on at least one valve body portion illustrated are on one or more cylindrical bosses arising from the disc-shaped body. When such a valve body portion is joined through one or more corresponding mating surfaces with another valve body portion in the illustrated embodiments, the cylindrical bosses form most of the cylindrical web(s) that space apart and connect the top and bottom portions after the respective corresponding mating surfaces are joined (e.g., by welding them together). In such an embodiment, only a single weld along each circular contact area of corresponding mating surfaces is needed to join the top and bottom valve body portions to form a valve body.

A space peripherally bounded by the boss on one valve body portion is incorporated in a hollow (i.e., an internal space) substantially or totally enclosed by the valve body (and peripherally bounded by the cylindrical web) as a result of joining the top and bottom valve body portions. Such a hollow may additionally include space comprising, for example, one or more depressions in the top and/or bottom portions that do not extend peripherally beyond the respective mating surfaces and that are substantially symmetrical about the longitudinal axis.

In alternative embodiments, both top and bottom portions may comprise a boss or both may simply have a circular mating surface without a boss. In the latter case, a separate cylindrical web structure of predetermined height may be welded (using two or more circular welds) between the two portions to establish the desired longitudinal spacing between the respective disc-shaped bodies (that is, the flanges) of the first and second portions.

The desired longitudinal spacing between first and second flanges is determined in part by the dimensions of the integral seal retention groove which is formed peripherally between the top and bottom valve body portions after they are joined. Seal retention groove dimensions for a valve body intended to be used, for example, as a replacement for another valve body previously used with a TRW Mission 4-web seat, must match analogous dimensions on the previously used valve body.

Regardless of the methods of valve body fabrication, peripheral areas of the respective flanges of the top and bottom portions substantially form the opposing walls of an integral seal retention groove in the finished valve body. A cylindrical web connecting the two opposing groove walls, or a portion thereof, forms the part of the wall of the seal retention groove that is closest to the valve body's longitudinal axis (i.e., the valve body's axis of symmetry). In such a valve body, relatively little machining is required to achieve a desired final shape because each of the top and bottom portions is formed to near-net-shape (with certain parts optionally machined to final shape) before the portions are joined. For example, serrations in a seal retention groove wall that would be suitable for retaining a cast-in-place elastomeric valve seal in the seal retention groove (without recourse to the bonding conventionally called for) may be formed by forging the serrations in the top and/or bottom valve body portions before they are joined, or by machining the serrations either before or after forging. Forming the serrations by forging may reduce both fabrication and materials costs by reducing or eliminating machining operations. If at least one serration is formed by forging or casting, it may retain its as-forged or as-cast surface, or portions may be machined to produce an as-machined surface before and/or after the portions are joined.

One or more fluid passages may be efficiently formed in a top valve body portion during forging. But if guide means (e.g., a guide stem) are centrally located on a top valve body portion, a centrally-located fluid passage (i.e., a fluid passage within the guide stem) will generally have to be drilled rather than punched out during forging due to the length of the guide stem. The relatively higher cost of drilling may be avoided if one or more fluid passages spaced apart from the longitudinal axis are instead punched out during forging of the top valve body portion.

One or more fluid passages spaced apart from a valve body's longitudinal axis may also serve a different function during valve body fabrication. As shown schematically in FIG. 3A, inertial welding of top and bottom valve body portions together involves temporary attachment of inertial elements (labeled 40 and 42) to the respective valve body portions. The temporary attachment must be relatively strong to counteract any tendency of a valve body portion to rotationally slip with respect to an inertial element to which it is temporarily attached. If an inertial element temporarily attached to a top valve body portion is additionally secured by one or more drive pins passing from the inertial element into one or more corresponding fluid passages spaced apart from the longitudinal axis, the likelihood of such rotational slippage is significantly reduced or eliminated (see FIG. 3B). After valve body fabrication, of course, one or more such fluid passages spaced apart from the longitudinal axis may facilitate fluid communication between one or more corresponding spaces internal to the valve body and space external to the valve body.

One or more corresponding spaces internal to a valve body may be formed during valve body fabrication when either or both of the top and bottom valve body portions comprise one or more corresponding symmetrical depressions (that is, depressions symmetrical about the longitudinal axis of symmetry). The hollow or hollows formed internal to the valve body when such portions are joined may substantially comprise, for example, a cylindrical space and optionally one or more toroidal spaces peripheral to the cylindrical space. Any such internal spaces will be substantially symmetrical about the valve body longitudinal axis and will be limited peripherally by a cylindrical web.

Each hollow or interior space thus formed by joining of top and bottom portions to make a valve body may be totally enclosed (i.e., not in fluid communication with space external to the valve body). Alternatively, the hollow or space may be substantially enclosed by the valve body but in fluid communication with space external to the valve body through a fluid passage in the valve body. The presence or absence of such a fluid passage affects pressure equalization across the valve body as well as the structure of the finished valve, particularly during carburization. When desired, such a passage may be formed, for example, by investment casting, forging or drilling as noted above. If the interior space is filled with flowable substance as described herein, this fluid passage may be sealed with a movable plug of a relatively light-weight material (e.g., a cast-in-place polymer insert) so as to prevent or retard passage of pumped fluid into the interior space when the valve body is put into service.

The presence of one or more hollows or filled spaces internal to a valve body of the present invention confers several advantages. The circular web maintains necessary flange stiffness while the mass of the valve body is relatively reduced, thus reducing impact loading compared to a valve body having similar flange stiffness but no internal space(s). Adequate valve body flange stiffness is maintained through the action of one or more cylindrical webs in conjunction with the flanges. Reducing impact loading while maintaining adequate valve body stiffness reduces the incidence of fatigue fractures and extends the service life of elastomeric seals, corresponding valve seats, and the valve bodies themselves.

In certain embodiments, the mass of a valve body may be kept relatively low by investment casting the top valve body portion with relatively thin walls. The bottom valve body portion in such embodiments may be forged, at least one cylindrical web spacing apart and connecting the top and bottom valve body portions. The bottom valve body portion as well as the relatively thin walls of the top valve body portion may be strengthened by carburization. Internal carburization of enclosed space(s) is made possible by at least one fluid passage between such enclosed valve body space(s) and space external to the valve body. Where present, the combination of internal and external carburization would create a relatively tough sandwich-like wall structure comprising a relatively softer core between the relatively harder (carburized) surface layers. Note that carburization of an intact valve body may beneficially be carried out in certain embodiments when both top and bottom valve body portions comprise carburizing steel. But if, for example, the steel of one valve body portion were not carburizing steel (e.g., AISI 4140), the higher carbon content of this steel after carburization of the intact valve body would cause excessive brittleness in the portion of the valve body comprising AISI 4140 steel.

In some illustrated embodiments of a valve body, a single interior hollow is substantially symmetrical about the valve body's longitudinal axis. The single hollow extends symmetrically along radial axes from the longitudinal axis peripherally to the cylindrical web, as well as extending along the longitudinal axis to the first and second flanges of the valve body's respective top and bottom portions. Should multiple interior hollows be desired, a single cylindrical interior hollow, for example, may be subdivided into a smaller (central) cylindrical hollow plus one or more toroidal spaces substantially symmetrical about the valve body's common longitudinal axis by the inclusion of one or more additional concentric cylindrical webs. Each web present extends between and thus spaces apart and connects the first and second flanges that are thus joined in the completed valve body. Inclusion of a center post symmetrical about the longitudinal axis in this example would result in conversion of the smaller cylindrical hollow into an additional (concentric) toroidal shaped hollow.

Each cylindrical web in a valve body functions in conjunction with the first and second flanges in a manner analogous to the web of an I-beam. Thus, a cylindrical web imparts resistance to deformation of the valve body about any radial axis. Bending stress about a radial axis, tending to cause deformation of the valve body, will largely result in corresponding tensile and compressive stresses in adjacent parts of the first and second flanges with relative sparing of the web itself. For this reason, the web thickness can be, and preferably will be, less than the thickness of the respective flange regions where they connect with the web in the finished valve body.

Note that in embodiments of a valve body which comprise a plurality of cylindrical webs, the structure resisting bending of the valve body about a radial axis will resemble one or more box beams rather than an I-beam. In such embodiments, two or more concentric cylindrical webs form the box beam webs, and these webs space apart and connect the compression-resisting and tension-resisting members (the flange regions). As described above, distortion about one or more radial axes will result primarily in tension and compression forces in the flange regions with relative sparing of the box beam webs (which can then be made relatively thinner).

Thus, whether valve bodies comprise one or a plurality of interior hollows, they are strong and stiff but relatively lightweight compared to competing designs without internal hollows. They are relatively easy to fabricate and require relatively little finish machining. They can reduce overall impact stress concentrations near sealing surfaces of the valve body and valve seat, resulting in improved durability and reduced wear in other components of valves in which such valve bodies are used.

DETAILED DESCRIPTION

Figure 1:
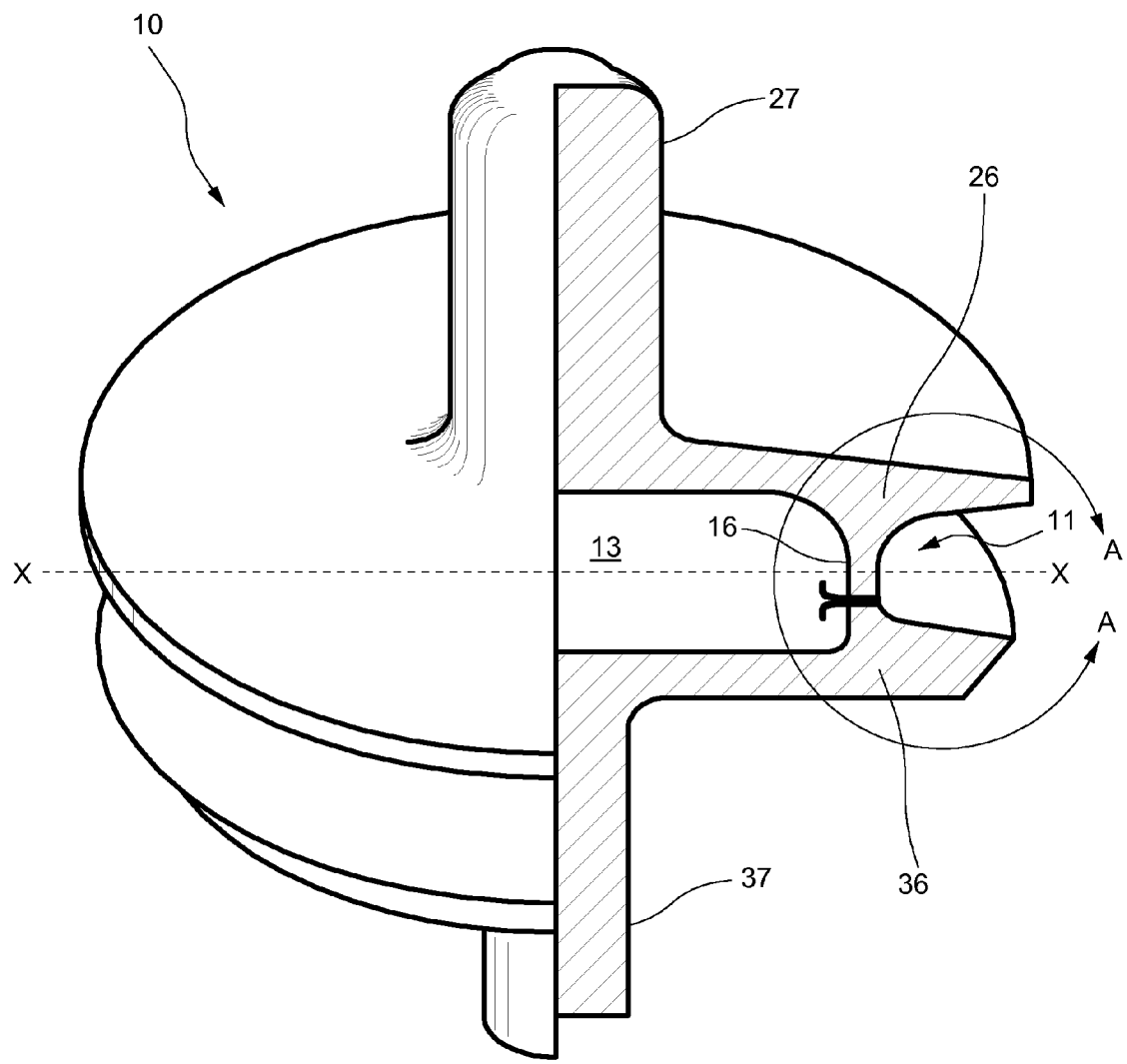
FIG. 1 illustrates a schematic view with partial cross-section of a valve body for use in web-seat, stem-guided valves; the valve body totally encloses a single hollow.

FIG. 1 illustrates a schematic view with partial cross-section of a valve body 10 for use in web-seat, stem-guided valves. Valve body 10 comprises integral seal retention groove 11, cylindrical web 16, first and second guide stems 27 and 37 respectively, and hollow 13. Seal retention groove 11 is machined smooth to accept a snap-on elastomeric seal. The area encircled by line A-A functions in a manner analogous to a theoretical I-beam wherein resistance to bending is always about an axis perpendicular to cylindrical web 16 (i.e., about a radial axis X-X). Thus, cylindrical web 16 functions to resist the wrinkling deformation described above. Note that the illustrated cross section encircled by line A-A in FIG. 1 suggests an I-beam shape, with the relatively lighter cylindrical web 16 positioned analogously to a web connecting the relatively heavier flange regions 26 and 36. In conjunction with its impact on a valve seat, the periphery of disc-shaped valve body 10 tends to be displaced in a direction substantially parallel to the (longitudinal) axis of symmetry of valve body 10. As noted above, such displacement in conjunction with use of a web seat tends to wrinkle the valve body periphery in a manner somewhat analogous to that observed in a cupcake paper. This manner of wrinkling, in turn, potentiates bending or distortion substantially about a plurality of axes (i.e., radial axes radiating perpendicularly from the longitudinal axis of symmetry of the valve body).

Bending about any such radial axis, however, is resisted by a combination of tension in flange region 26 and compression in flange region 36 or vice versa, depending on the direction of bending. The separation (that is, spacing apart) of flange regions 26 and 36 which is effected by cylindrical web 16 thus substantially increases the stiffness of valve body 10 with relatively little increase in weight.

Note that in certain embodiments of valve body 10 for oil field service, the diameter of first guide stem 27 is determined by API standards, while the diameter of second guide stem 37 is determined by the size of the corresponding guide stem hole in a TRW Mission 4-web seat commonly used in the oil industry. Note also that valve bodies such as valve body 10 in FIG. 1 can be used with standard length valve springs in web-seat, stem-guided valves. Older designs such as the Channel-Beam configuration, in contrast, require longer valve springs in general because of the characteristic bowl-shaped depression present in the valve body.

Figure 2A:
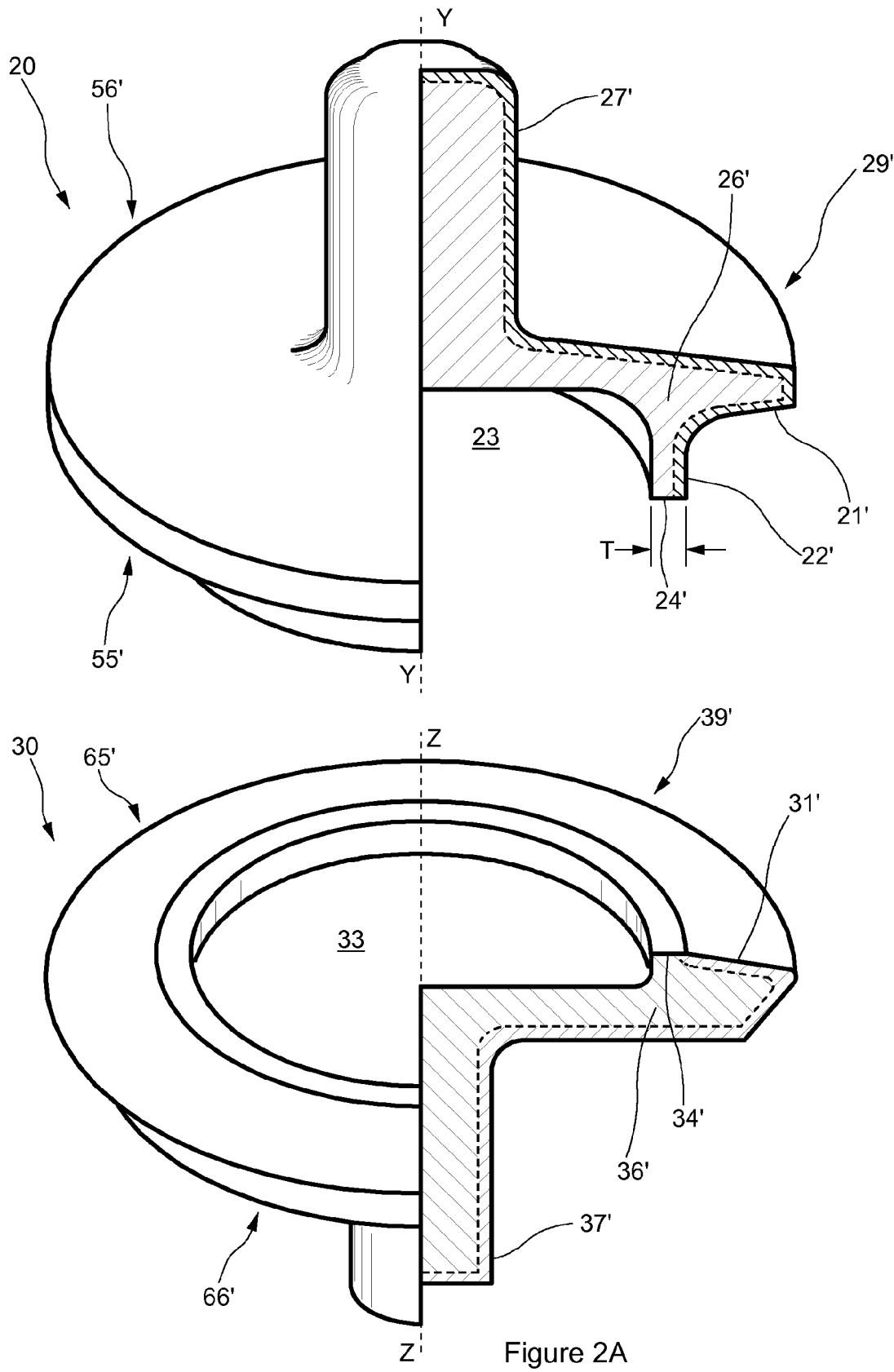
FIG. 2A schematically illustrates partial cross-sections showing first and second portions of a near-net-shape valve body prior to joining of the portions.
Figure 3A:
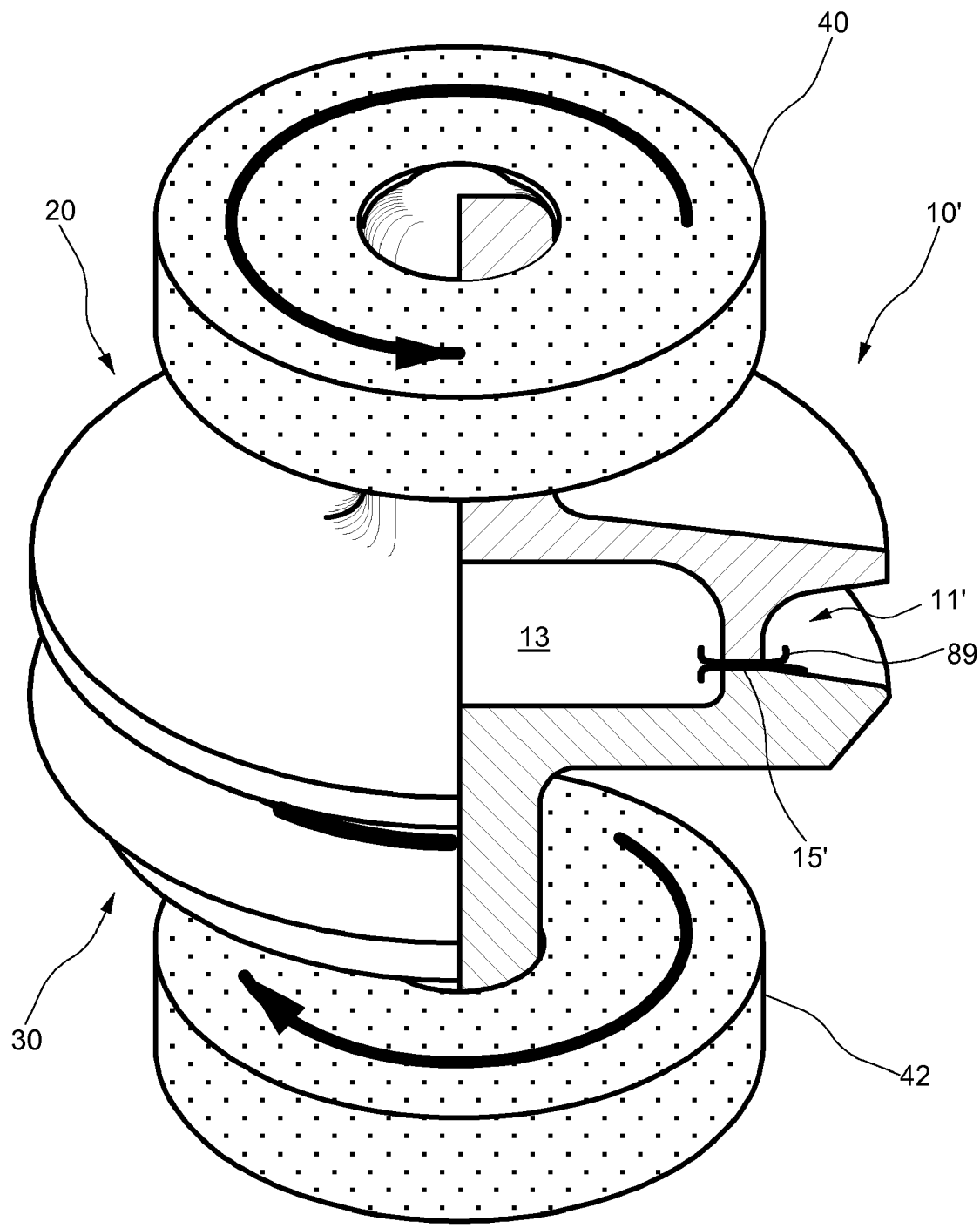
FIG. 3A schematically illustrates relative motion of the two portions of a valve body to facilitate frictional welding for joining the two portions.

FIG. 2A schematically illustrates partial cross-sections showing a near-net-shape top portion 20 and a near-net-shape bottom portion 30 before they are joined to form a near-net-shape valve body 10' as seen in FIG. 3A. A near-net-shape valve body 10' can be finish machined to the form of valve body 10 as shown in FIG. 1 by removal of relatively little material, compared to the material removal that would be required if a valve body of similar external shape were forged in one piece. For severe valve service conditions, both portion 30 and portion 20 can be forged (instead of, for example, being cast) in an appropriate metal such as mild steel to near-net-shape. But casting of at least one portion 20 or 30 may lower fabrication costs of valves.

In the illustrated embodiment of FIG. 2A, top portion 20 is forged substantially symmetrically about a first longitudinal axis y-y. Top portion 20 comprises a first disc-shaped body 29' having first and second opposing sides, 55' and 56' respectively, and flange region 26' which is adjacent to cylindrical boss 22'. The first opposing side 55' of disc-shaped body 29' comprises cylindrical boss 22', circular boss mating surface 24' and one of two opposing integral seal retention groove walls, groove wall 21'. Note that primes on labels such as groove wall 21' and flange region 26' denote the respective structures prior to finish machining. A substantially cylindrical space 23 is peripherally bounded by boss 22' on said first opposing side 55' of first disc-shaped body 29', and a first guide stem 27' extends from second opposing side 56' of first disc-shaped body 29', extending away from substantially cylindrical space 23 along longitudinal axis y-y. Substantially cylindrical space 23 is peripherally limited by cylindrical boss 22', cylindrical boss 22' comprising a circular boss mating surface 24' and having a wall thickness T measured at cylindrical boss mating surface 24. The wall thickness of cylindrical boss 22' preferably tapers from a relatively greater value at the boss base (adjacent to flange region 26'), which includes fillets for stress relief, to a smaller and substantially uniform value near the circular boss mating surface 24'. The wall thickness of cylindrical boss 22' will thus preferably be everywhere equal to or greater than T (the wall thickness at the cylindrical boss mating surface 24). Note that small inconsistencies in thickness of a cylindrical web 16 (which is substantially formed from cylindrical boss 22' upon joining of the first and second portions) are associated with different methods of joining. Such methods include, but are not limited to, frictional welding, electron beam welding, flash welding, tungsten-inert-gas (TIG) welding, metal-inert-gas (MIG) welding, laser welding, submerged electric arc welding (SAW), and electric arc (stick) welding. Specifically, for example, welding flash will generally protrude from a frictional weld into adjoining areas, and this flash may either be machined from accessible surfaces or it may be left in place in certain embodiments. As noted elsewhere herein, frictional welding flash may serve in certain embodiments to aid in securing a cast-in-place elastomeric seal in the seal retention groove without the need for bonding. If a different type of joining method (such as electron beam or electric arc welding) is employed, resulting in little or no welding flash protruding in the seal retention groove, then one or more serrations in one or both retention groove walls may be used to secure a cast-in-place seal as described above. For additional seal-securing action, frictional welding flash may be combined, in certain embodiments, with one or more groove wall serrations.

Bottom portion 30 is forged substantially symmetrically about a second longitudinal axis z-z. Bottom portion 30 comprises a second disc-shaped body 39' having first and second opposing sides 65' and 66' respectively and flange region 36' adjacent to circular mating surface 34'. The first opposing side 65' of second disc-shaped body 39' comprises corresponding circular mating surface 34'. Surface 34' corresponds to (i.e., is sized and shaped to allow substantially complete contact with) circular boss mating surface 24'. Note that circular mating surfaces 24' and 34' in near-net-shape portions 20 and 30 may or may not be machined before the portions are joined. Machining the mating surfaces before joining would generally reduce the energy required for a frictional weld and would also reduce the amount of welding flash produced during frictional welding.

First opposing side 65' also comprises coaxial substantially symmetrical depression 33 and one of two opposing integral seal retention groove walls, groove wall 31'. A second guide stem 37' extends from second opposing side 66' of second disc-shaped body 39', extending away from circular depression 33 along longitudinal axis z-z. Note that as discussed above, substantially symmetrical depression 33 (or an analogous space) may or may not be present in alternative embodiments of valve bodies of the invention when cylindrical space 23 (or an analogous space) is also present. Note also that primes on labels such as groove wall 31', second guide stem 37', and flange region 36' denote the respective structures prior to finish machining.

Figure 2B:
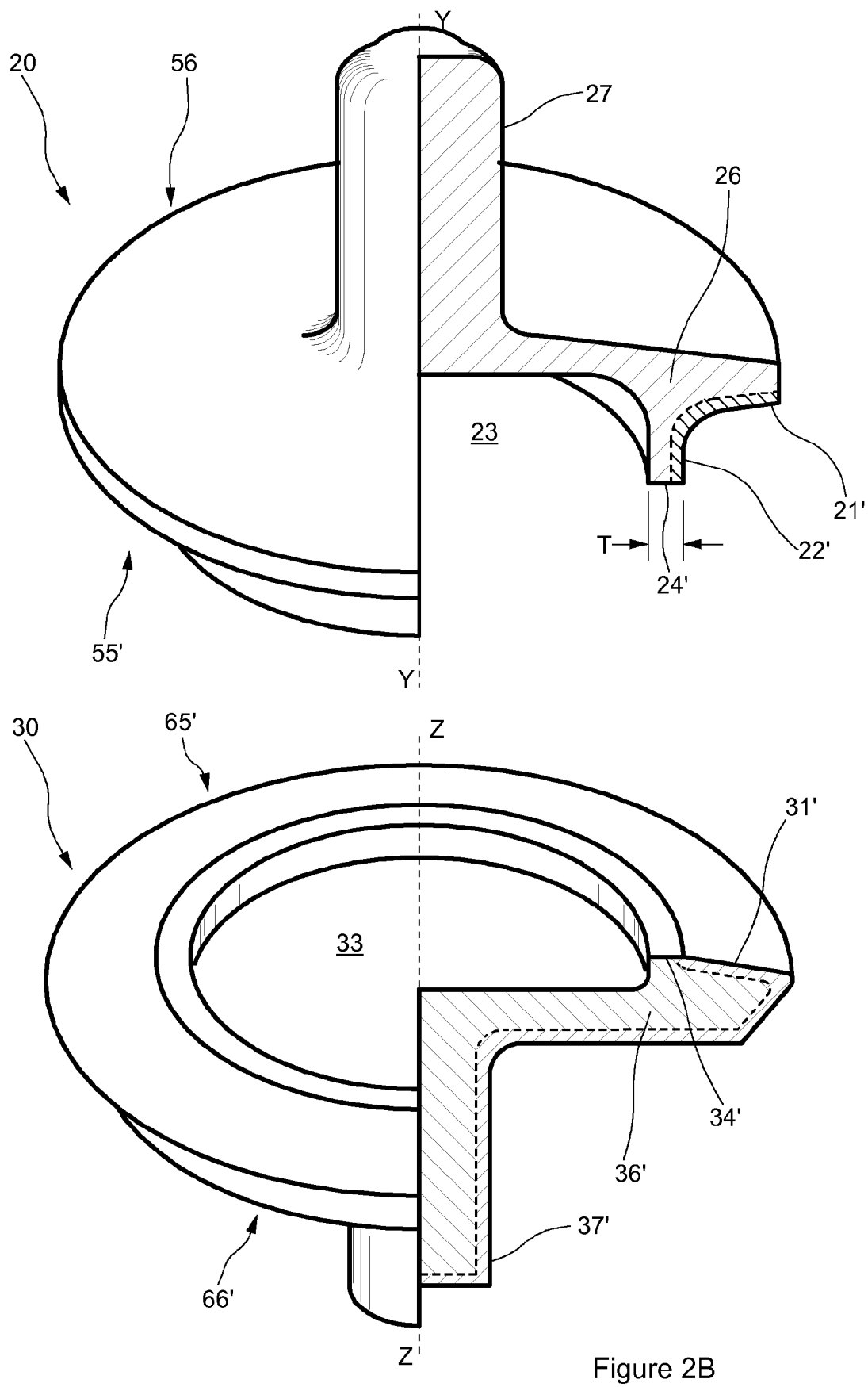
FIG. 2B schematically illustrates partial cross-sections showing first and second portions of a valve body prior to joining of the portions as in FIG. 2A, except that finish machining has been applied to the upper part and periphery of the first portion, including the guide stem.
Figure 2C:
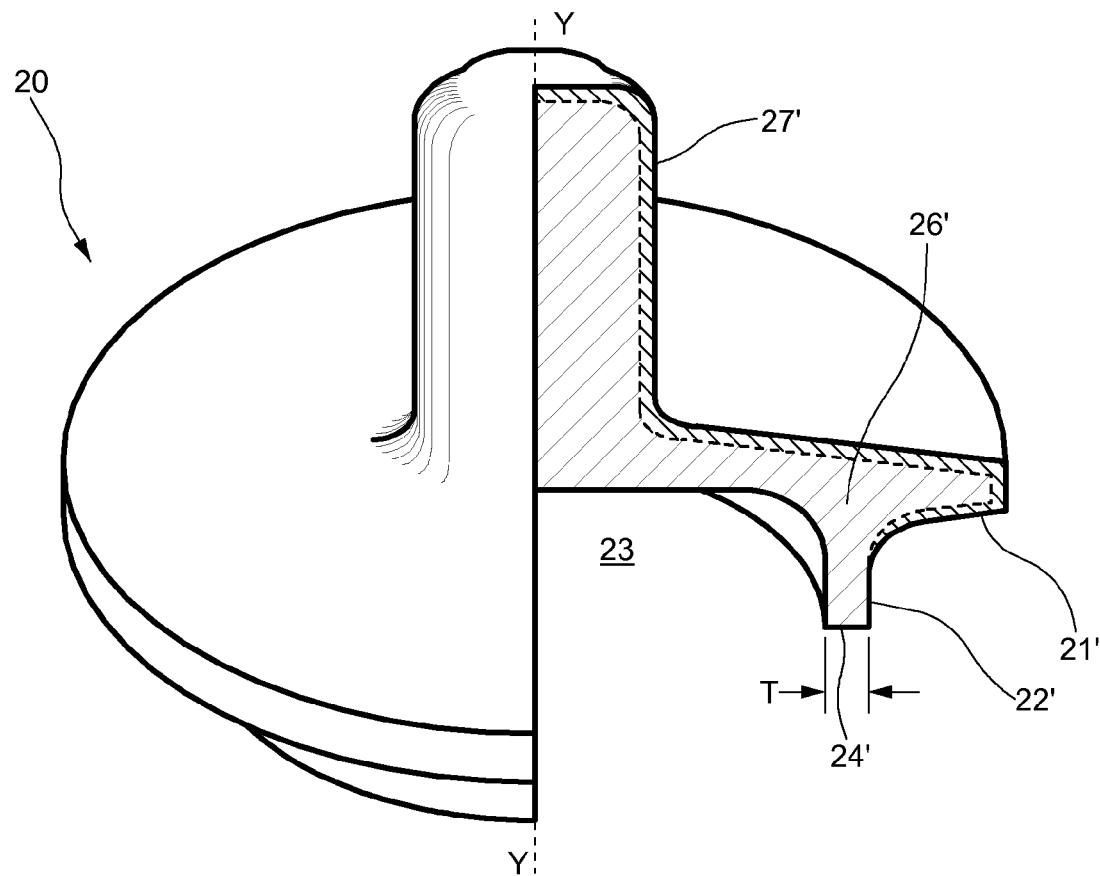
FIG. 2C schematically illustrates partial cross-sections showing first and second portions of a valve body prior to joining of the portions as in FIG. 2B, except that finish machining has been applied additionally to areas of the second portion that will form part of the seal retention groove.
Figure 2C:
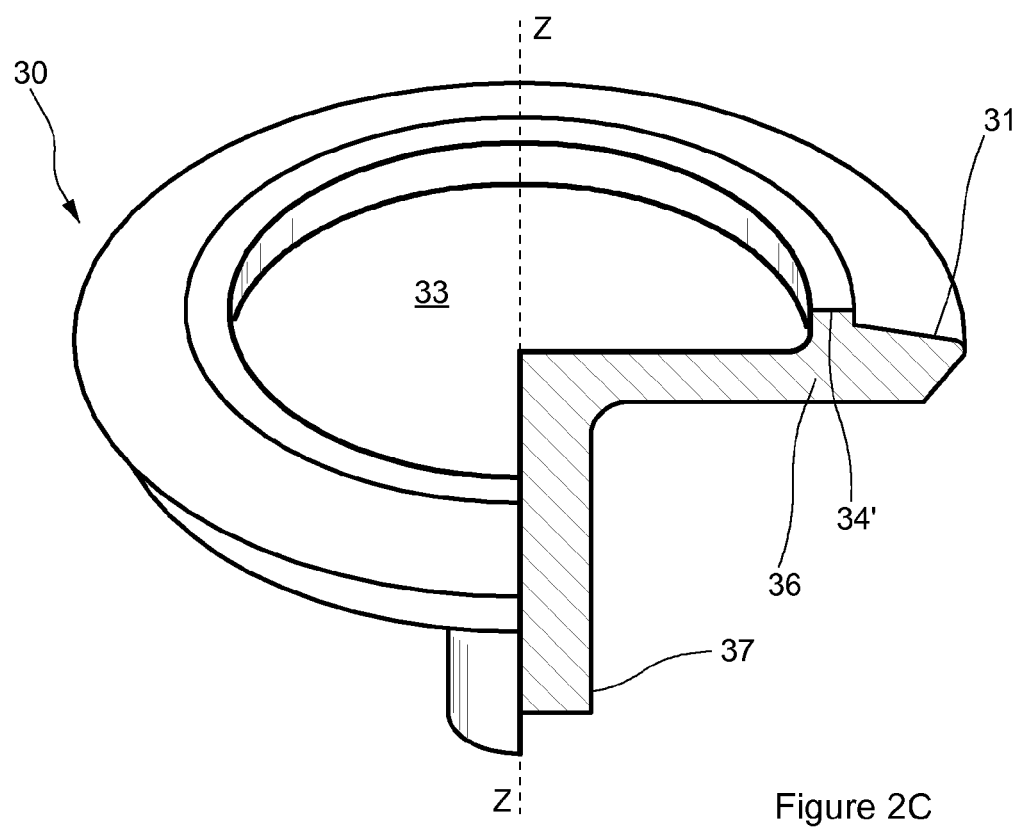
Figure 2D:
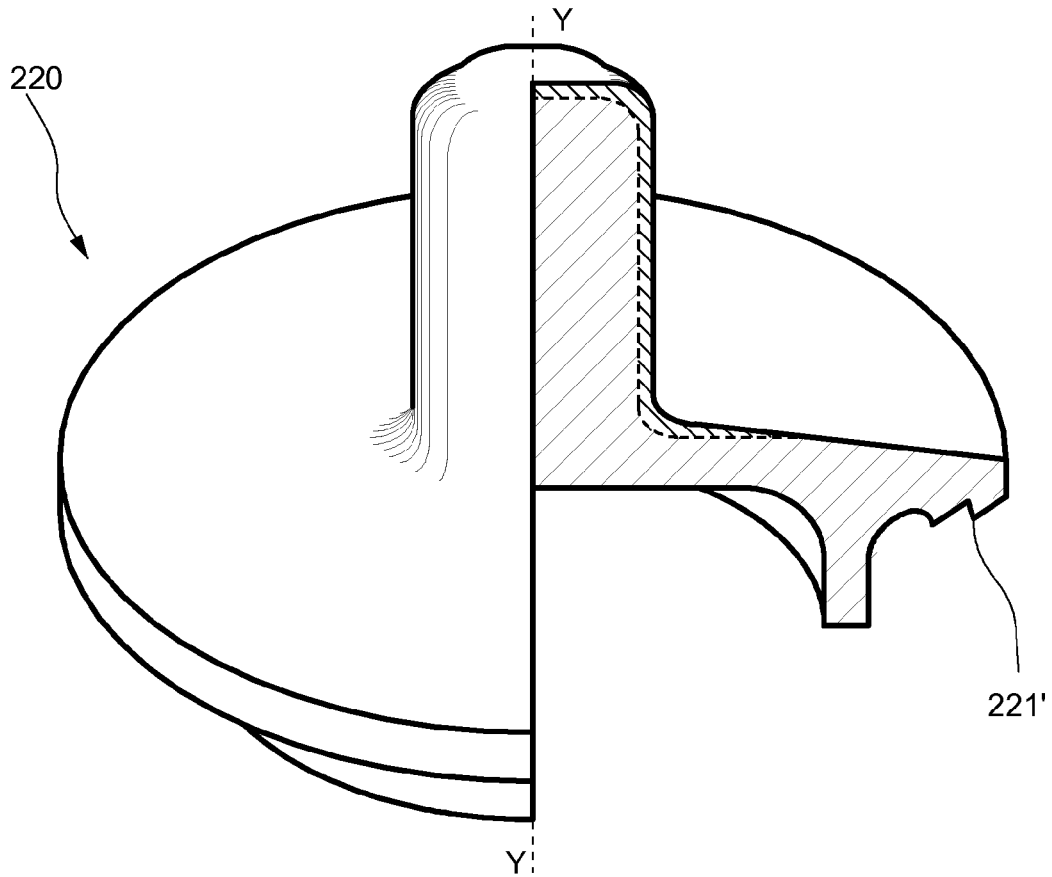
FIG. 2D is similar to FIG. 2C except that it schematically illustrates a valve body portion that incorporates seal retention wall serrations that are formed by forging or casting as well as a valve body portion that incorporates serrations that are formed by finish-machining.
Figure 2D:
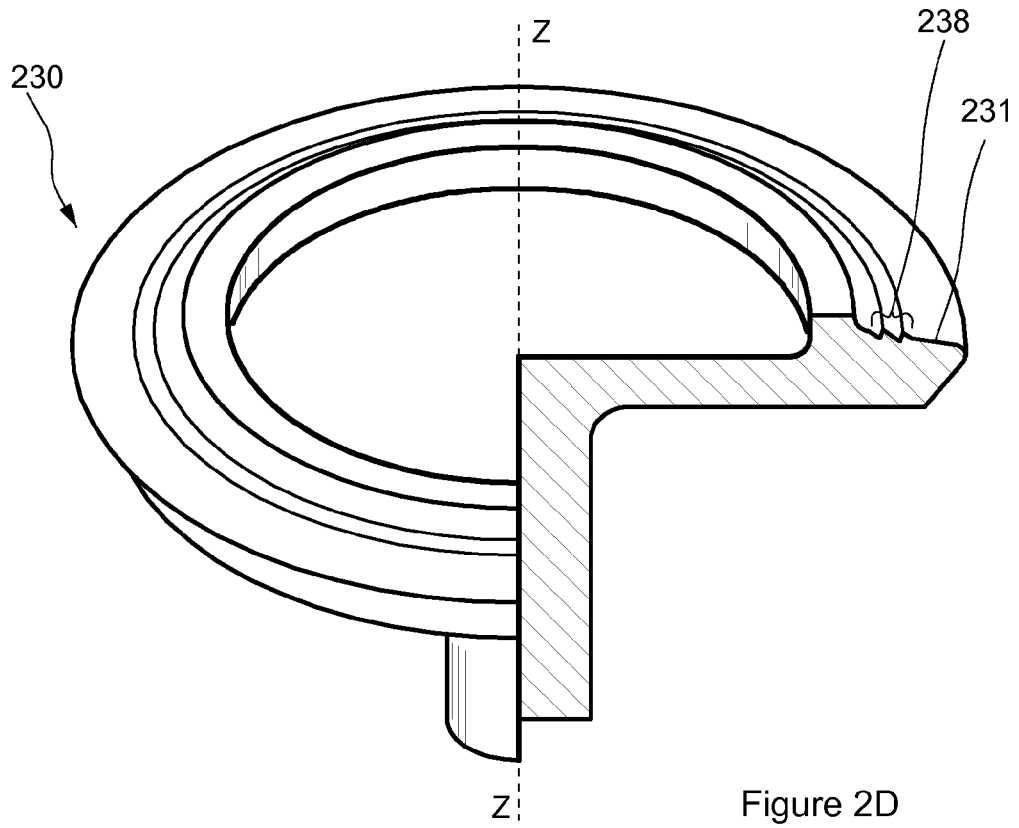
Figure 2E:
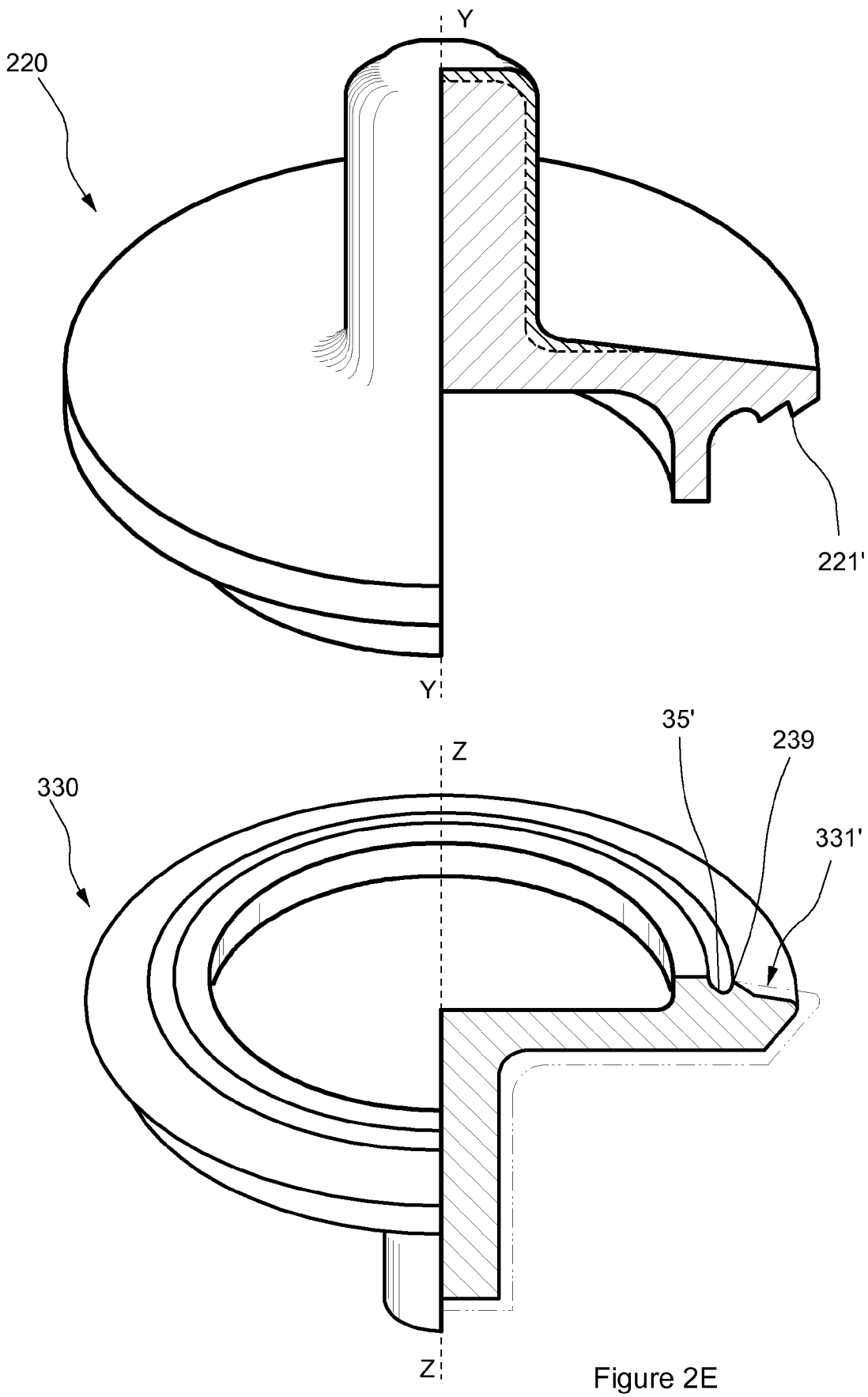
FIG. 2E is similar to FIG. 2C except that it schematically illustrates a valve body portion that incorporates seal retention groove wall serrations that are formed by forging or casting as well as a valve body portion that incorporates serrations that are formed by a combination of finish-machining involving a structural feature that was earlier formed by forging or casting.
Figure 2F:
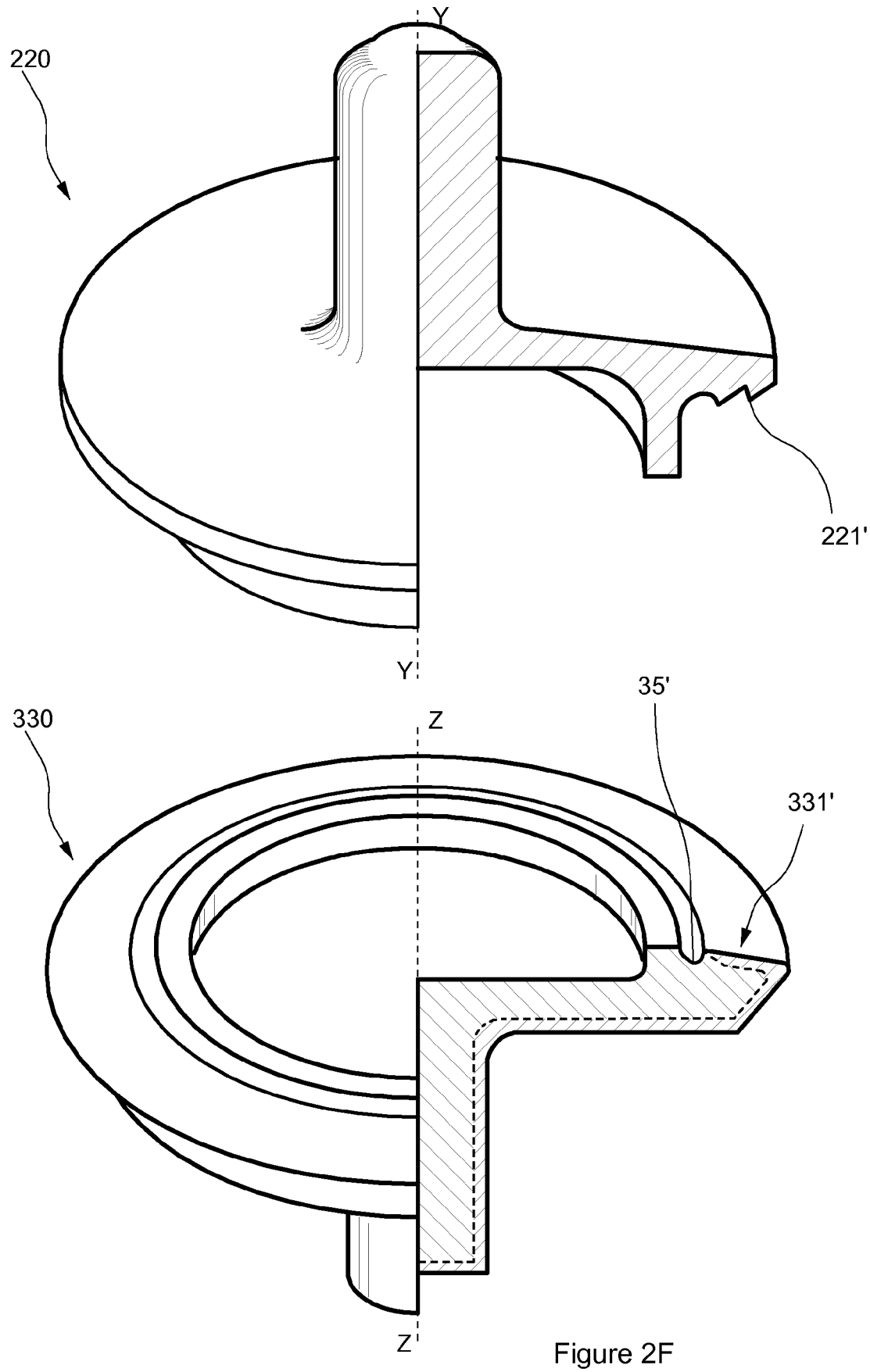
FIG. 2F is similar to FIG. 2B except that FIG. 2F schematically illustrates two valve body portions that incorporate seal retention wall serrations that are formed by forging or casting during the formation of each portion.

In various valve body embodiments certain finish machining steps may preferably be performed either before or after joining of first and second portions. For example, in a finished valve body the longitudinal axes of symmetry of first guide stem 27 and second guide stem 37 (see FIG. 8A) are necessarily colinear, thus forming the longitudinal axis of symmetry of the finished valve body. Because of slight misalignment of these two axes which might become apparent after joining of the first and second portions, it may be preferable not to finish machine both guide stem 37 and guide stem 27 before the portions are joined. By delaying finish machining of one or both of the first and second guide stems until after joining of the first and second portions, any slight misalignment of either guide stem axis that becomes apparent after joining can be corrected in the finished valve body. For example, FIG. 2B schematically illustrates that final machining of guide stem 27 and side 56, including the periphery of portion 20 (i.e., a portion of flange region 26) has been accomplished prior to mating of the first and second portions in preparation for joining, whereas guide stem 37' remains near-net-shape (that is, not finish machined) until after joining. FIG. 2F is similar to FIG. 2B but differs in several respects. For example, FIG. 2F schematically illustrates a portion 220 in which serrations 221' are forged or cast during the formation of portion 220 itself by forging or casting respectively. As indicated in FIG. 2F, serrations 221' in this embodiment require no finish machining to accomplish their intended function of aiding retention of a cast-in-place elastomeric seal in the retention groove without the necessity of a bonding agent between seal and groove. Additional differences between FIGS. 2B and 2F are seen in portion 330 (see FIG. 2F) which includes a groove 35' that is forged or cast in portion 330 as the portion is being formed. This groove 35', which is not present in FIG. 2B, is located in the (unmachined) seal retention groove wall 331' (see FIG. 2F). A part of groove 35' will form part of a seal retention groove wall serration after machining as described below.

Where precise alignment of machined surfaces on the first and second portions is less critical, as in the opposing walls of a seal retention groove for a seal that is to be cast and cured in place, finish machining of the groove walls may be accomplished before the joining of the first and second portions of a valve body. On the other hand, where seal retention groove dimensions are critical, as in the spacing of opposing walls of a groove for a snap-on seal, finish machining of at least one groove wall must be delayed until after the first and second portions are joined. When the first and second portions can be handled individually, surfaces that can be machined before joining are preferably machined then because they are more readily accessible than they would be after joining. This easy access means quicker machine set-up times and reduced machining costs. For example, FIG. 2C schematically illustrates final machining of certain surfaces (including guide stem 37 and groove wall 31) prior to joining of the first and second portions, leaving final machining of other surfaces (as, for example, of guide stem 27' and groove wall 21') to be completed after joining. Because of its proximity to mating surface 34' (where welding flash may be present after joining) the adjacent area of groove wall 31 is more accessible for any desired final machining prior to joining of the first and second portions than it would be after joining. FIGS. 2D and 2E are similar to FIG. 2C except that they each schematically illustrate a portion 220 that incorporates serrations 221' that are formed (as by forging or casting) but not finish-machined either before or after joining of first and second portions to form a valve body. See the above discussion relating FIG. 2F to FIG. 2B. Additional differences from FIG. 2C that are present in FIG. 2D include the presence of machined serrations 238 on seal retention groove wall 231. In the embodiment of FIG. 2D, serrations 238 are machined prior to joining of portions 220 and 230 for form a valve body. FIG. 2E schematically illustrates yet another embodiment in which groove 35' is first formed in seal retention groove wall 331' by forging or casting, and then serration 239 is formed (in part by groove 35') by finish machining to the surface indicated by the solid line inside the broken line (the broken line indicating the as-forged or as-cast surface). Note that FIG. 2F indicates the as-forged or as-cast surface with a solid line, while the finish-machined surface is indicated with a broken line. The finish machining may be accomplished either before or after joining the two valve body portions to form a valve body.

Thus, serration 239 differs from serrations 238 in that serration 239 in seal retention groove wall 331 comprises a combination of as-forged and as-machined surfaces, or a combination of as-cast and as-machined surfaces, depending on whether groove 35' was earlier formed by forging or casting respectively. On the other hand, serrations 238 in seal retention groove wall 231 comprise as-machined surfaces but no as-forged or as-cast surfaces. Note that some of the serrations shown in FIGS. 2D, 2E and 2F, being formed by forging or casting but not by finish machining, are illustrated larger than serrations formed by finish machining. This is because forging (in particular) can not achieve the finer surface detail that is possible with finish machining.

To make a valve body, top portion 20 is joined to bottom portion 30, preferably with a weld at the junction of mating surface 24' of cylindrical boss 22' and corresponding mating surface 34'. Note that both cylindrical boss mating surface 24' and corresponding mating surface 34' are surfaces of substantially identical dimensions and complementary shape, so that the two mating surfaces may be brought into substantially complete contact with each other to form a circular contact area. After joining of the first and second portions 20 and 30 respectively (as, for example, by frictional welding), any necessary finish machining (for example, that of one or both guide stems and/or parts of seal retention groove 11) is completed as needed to produce a finished valve body 10.

Figure 5A:
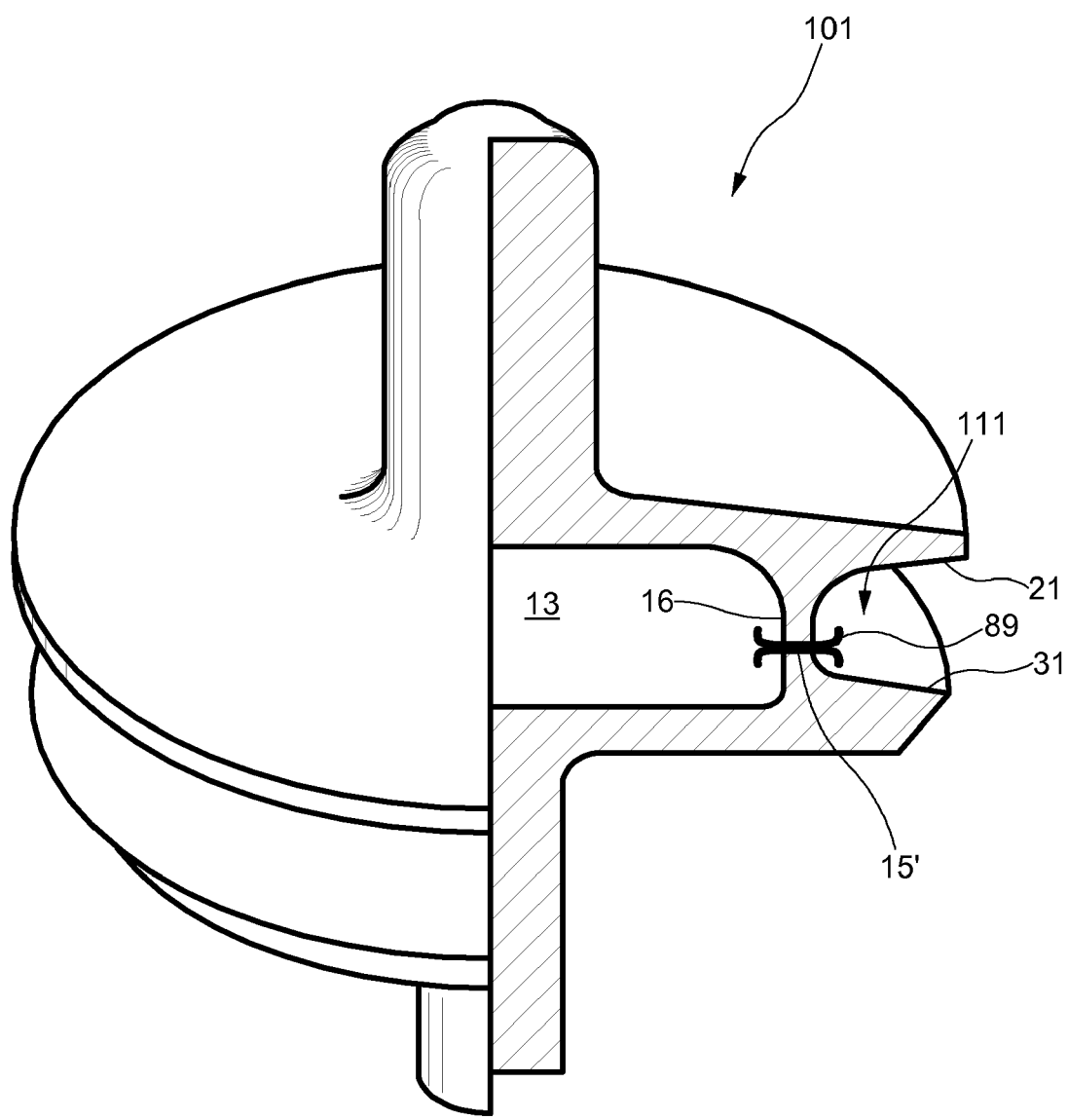
FIG. 5A schematically illustrates a partial cross-section of the valve body of FIG. 4A after machining to a final desired shape; the valve body totally encloses a hollow.

Structures in the finished valve body 101, as illustrated and labeled in FIG. 5A, are formed as follows. Cylindrical boss 22 on top portion 20 will form part of a cylindrical web 16 which, in turn, will form the part of the wall of the integral seal retention groove 111 that is closest to the valve body's longitudinal axis of symmetry (i.e., that part of the groove wall which lies between and connects its two opposing walls 21 and 31; the part of portion 20 labeled 21' in FIGS. 2A, 2B and 2C will form part of a first opposing wall, labeled 21 in FIG. 5A because it is a finished machined part of integral seal retention groove 111. The part of portion 30 labeled 31' in FIGS. 2A and 2B will form part of a second opposing wall, labeled 31 in FIG. 5A because it is a finished machined part of integral seal retention groove 111. And the hollow 13 (labeled in FIG. 5A) will be substantially formed from the combination of cylindrical space 23 and circular depression 33 shown in portions 20 and 30 respectively in FIGS. 2A, 2B and 2C. Note that finished valve body 101 in FIG. 5A is similar to finished valve body 10 in FIG. 1 except that welding flash 89 protrudes into seal retention groove 111 of valve body 101, whereas there is no such protrusion into seal retention groove 11 of valve body 10.

In making embodiments of a valve body for applications where fatigue failure is a dominant concern, portions 20 and 30 are preferably both forged. In alternative embodiments, one portion may be cast while the other is forged. While forging imparts a desirable grain structure to metal, making it relatively resistant to failure under repeated impact loads, casting may be more suitable than forging for manufacturing relatively complex shapes. Embodiments of the invention in which both portions 20 and 30 are forged are suitable for applications requiring excellent impact resistance, whereas a combination of desired characteristics (such as good impact resistance with a relatively complex functional shape) can be achieved when one of the portions 20 and 30 is forged and the other is cast.

Figure 3B:
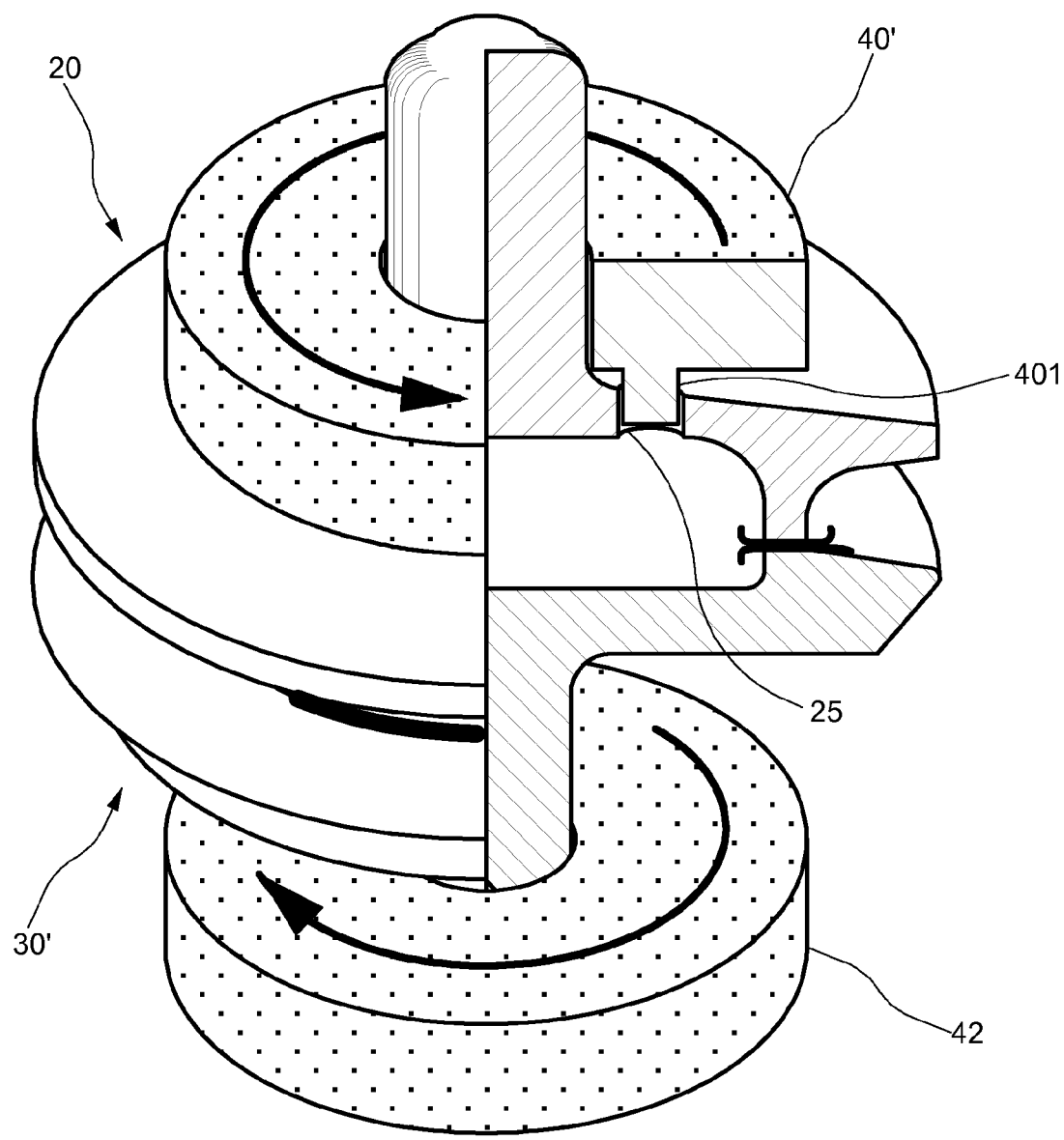
FIG. 3B schematically illustrates an arrangement of features analogous in part to that in FIG. 3A but with the presence of a drive pin extending from an inertial element into a fluid passage spaced apart from the valve body longitudinal axis.

FIG. 3A schematically illustrates inertia wheels 40 and 42 being coupled to portions 20 and 30 respectively and rotating as indicated to establish relative motion between portions 20 and 30 where the portions' corresponding mating surfaces contact at 15' (which will be the site of a frictional weld, from which welding flash will protrude into hollow 13 and into seal retention groove 11'). FIG. 3B schematically illustrates an alternative approach to friction welding with inertia wheels 40' and 42 being coupled to portions 20' and 30 respectively and rotating as indicated to establish relative motion between portions 20' and 30. Inertia wheel 40 differs from inertia wheel 40' in that a drive pin 401 extends from inertia wheel 40' to engage portion 20' via fluid passage 25, thereby assisting in establishing relative motion between portions 20' and 30. Fluid passage 25 is spaced apart from the longitudinal axis about which portion 20' is substantially symmetrical.

Note that relative motion may be established as indicated by counter-rotation of inertia wheels 40 and 42 (or by counter-rotation of inertia wheels 40' and 42), or by one inertia wheel rotating faster than the other but in the same direction, or by one inertia wheel being stopped and the other one rotating. Note further that portions 20 and 30 (or portions 20' and 30) may also be joined by any other suitable method known to those skilled in the art. Such methods include electric arc welding or electron beam welding or any other method which, after finish machining, results in a junction 15' (as seen, for example, in FIG. 5A) having sufficient strength to maintain the integral character of the seal retention groove in use.

Figure 4A:
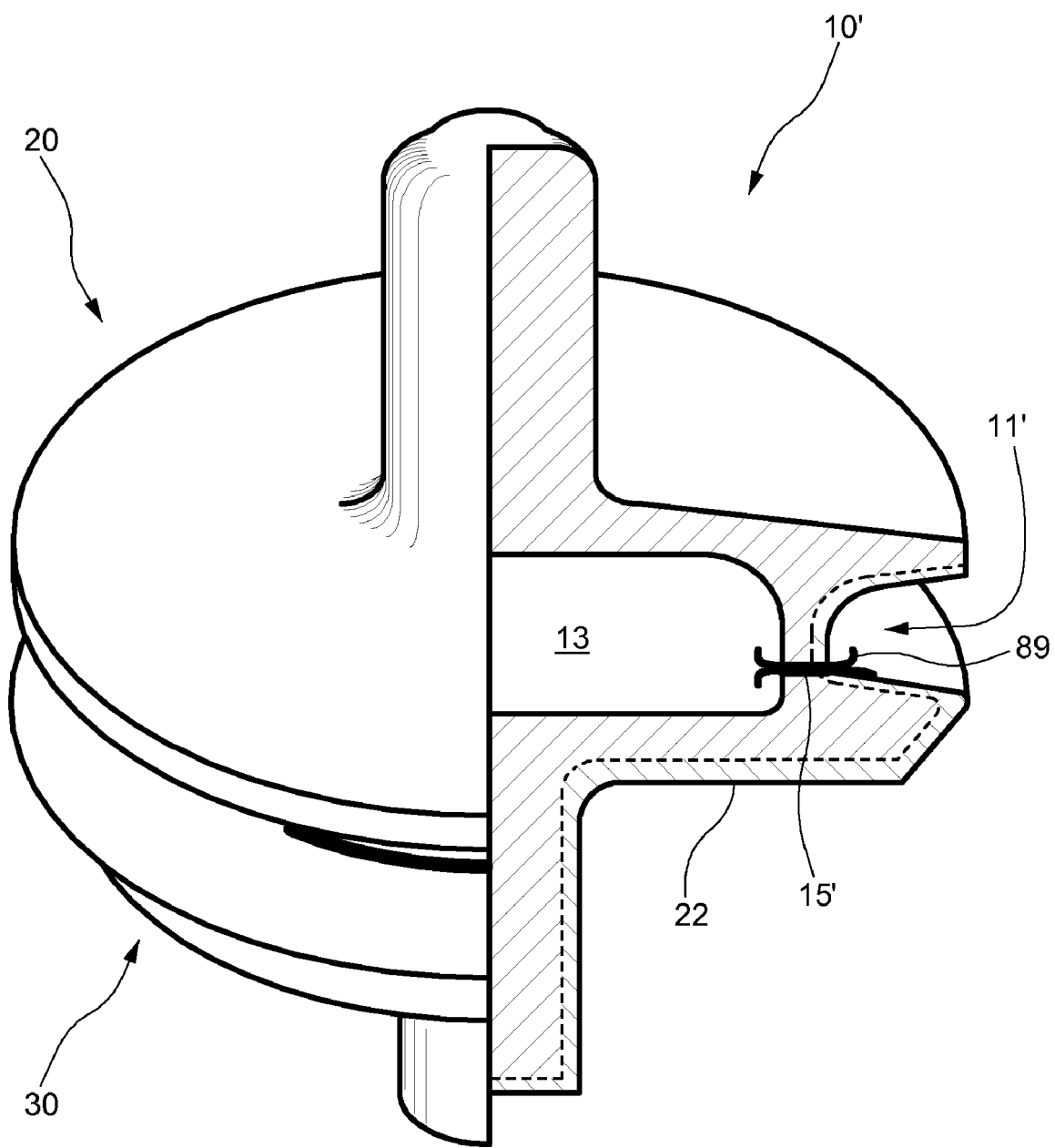
FIG. 4A schematically illustrates a partial cross-section of the two portions shown in FIG. 3A welded together to form a near-net-shape valve body.
Figure 4B:
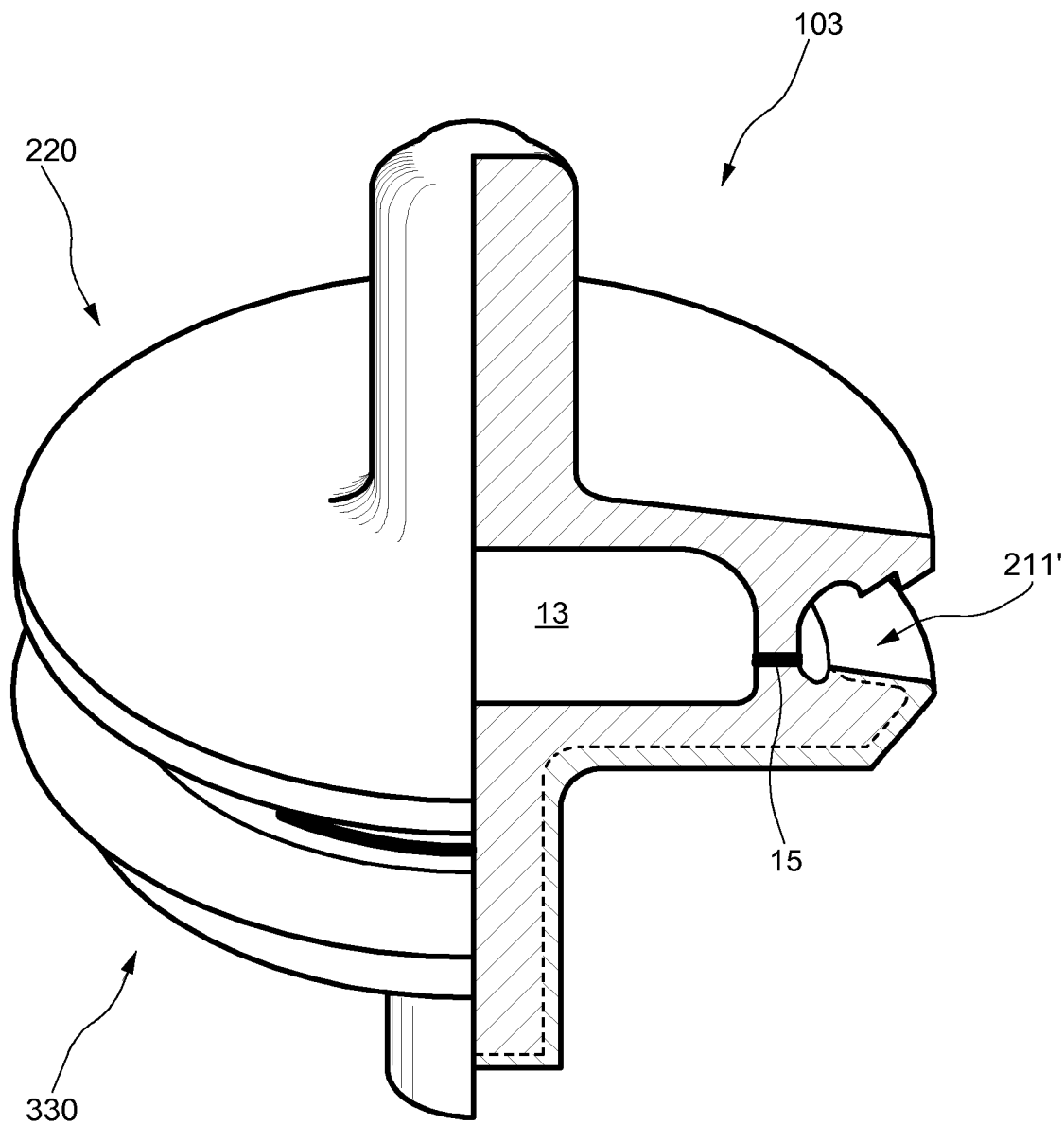
FIG. 4B schematically illustrates a partial cross-section of a valve body comprising the valve body portions illustrated in FIG. 2E.
Figure 8A:
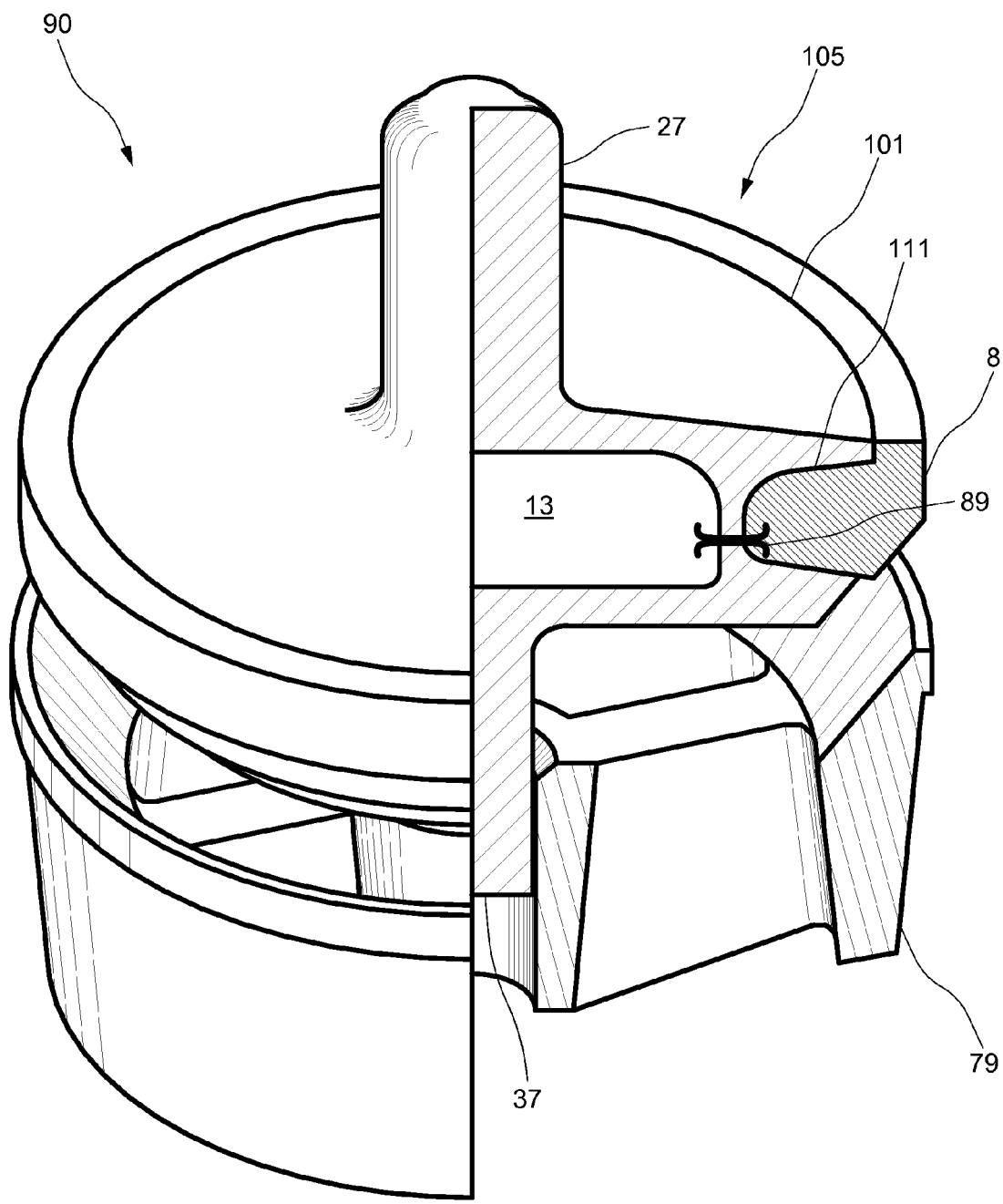
FIG. 8A schematically illustrates a valve assembly comprising a 4-web valve seat and a stem-guided valve body and seal assembly. An elastomeric seal is shown cast internal to the integral seal retention groove of the valve body without a bonding layer between the seal and the groove.
Figure 8B:
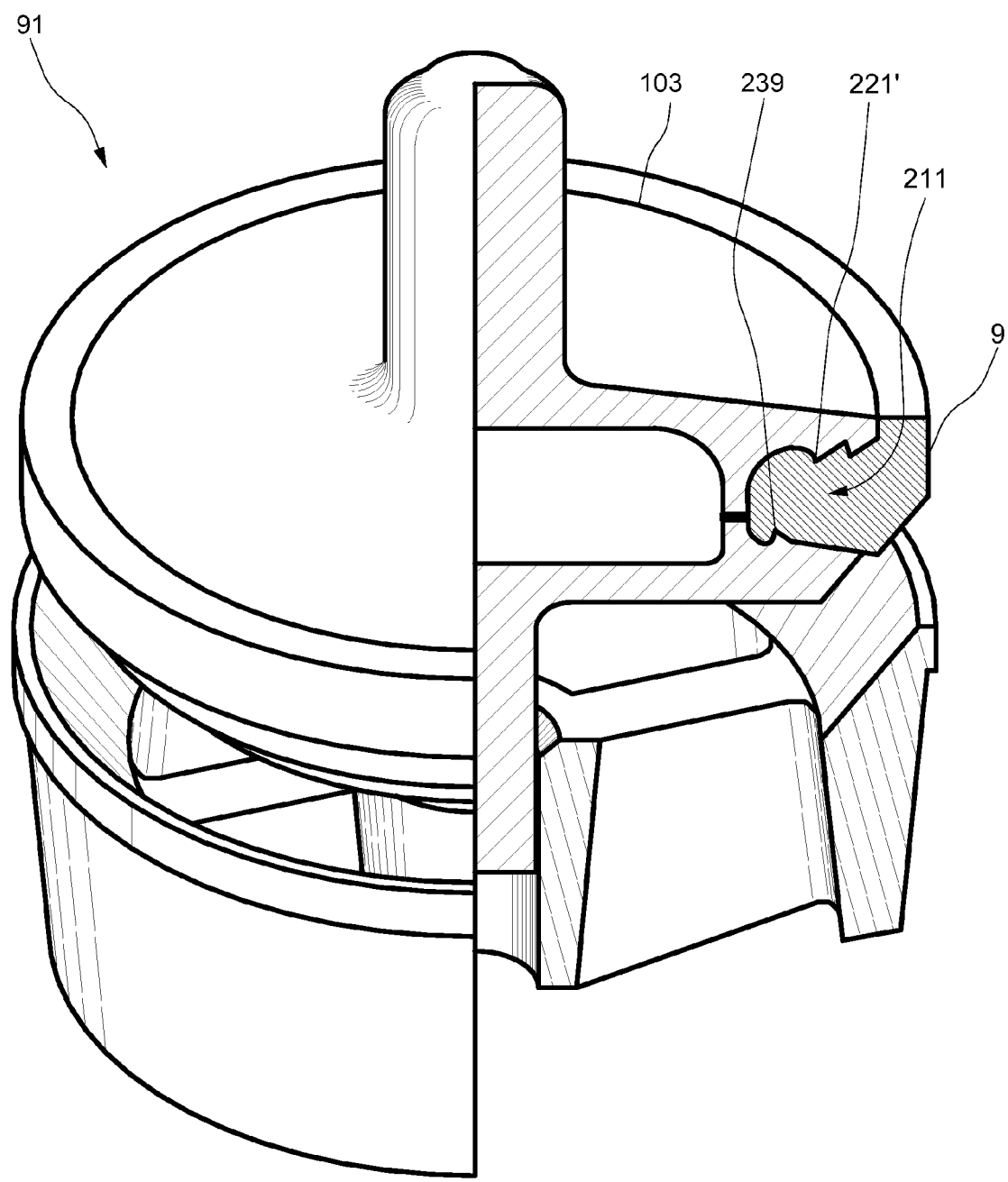
FIG. 8B schematically shows how, after finish machining as indicated by the dotted line in FIG. 4B, the lower seal retention groove wall will comprise a serration that acts in conjunction with serrations on the upper seal retention groove wall to retain a cast-in-place elastomeric seal in the seal retention groove without the need for bonding.

FIG. 4A schematically illustrates a partial cross-section showing weld 15' joining portions 20 and 30 to form near-net-shape valve body 10'. Valve body 10' comprises a hollow 13 and a near-net-shape integral seal retention groove 11' into which welding flash 89 protrudes. The dashed line in the cross-sectional view schematically demarcates the reverse cross-hatched area 22 which indicates material (including welding flash 89) that will be removed during final machining to form a finished valve body 10 as shown in FIG. 1. Since the welding flash, if present, can act to secure a cast-in-place elastomeric seal in a seal retention groove, embodiments of the invention from which the welding flash has been removed may incorporate at least one serration in at least one groove wall for securing a cast-in-place seal in the groove without the necessity of a bonding agent between seal and groove. FIG. 4B schematically illustrates a valve body 103 comprising the portions 220 and 330 illustrated in FIG. 2E joined and partially machined, the two joined portions forming seal retention groove 211'. FIG. 8B schematically illustrates valve body 103 after finish machining as a component of a valve assembly 91, showing how, after finish machining as indicated by the dotted line in FIG. 4B, the lower wall of seal retention groove 211 will comprise a serration 239 that acts in conjunction with serrations 221' on the upper seal retention groove wall to retain a cast-in-place elastomeric seal 9 in the seal retention groove without the need for bonding. Note that because of the lack of bonding, the above serrations allow small relative movements of an elastomeric seal with respect to the groove wall during the elastomer shrinkage associated with seal curing and also during valve operation. Such small movements redistribute stress internal to the seal elastomer and thus tend to temporarily relieve areas of relatively high stress (e.g., when the seal elastomer is distorted as the valve is closing). These small movements are limited by the serrations, which function to return the seal to its lowest-stress position in the groove (e.g., the position occupied when the valve is open) after a high-stress interval (i.e., an interval in which the seal is distorted) has passed. The small movements of an elastomeric seal relative to its groove are generally sliding movements, but separations of the seal and portions of the valve body groove occur, for example, as the seal changes its shape (due to the generally anisotropic seal shrinkage associated with curing of the seal elastomer). Temporary separations of portions of the seal from the valve body groove also occur as the seal is periodically distorted when the valve body is in use (e.g., especially during rapid open-close cycling).

Figure 5B:
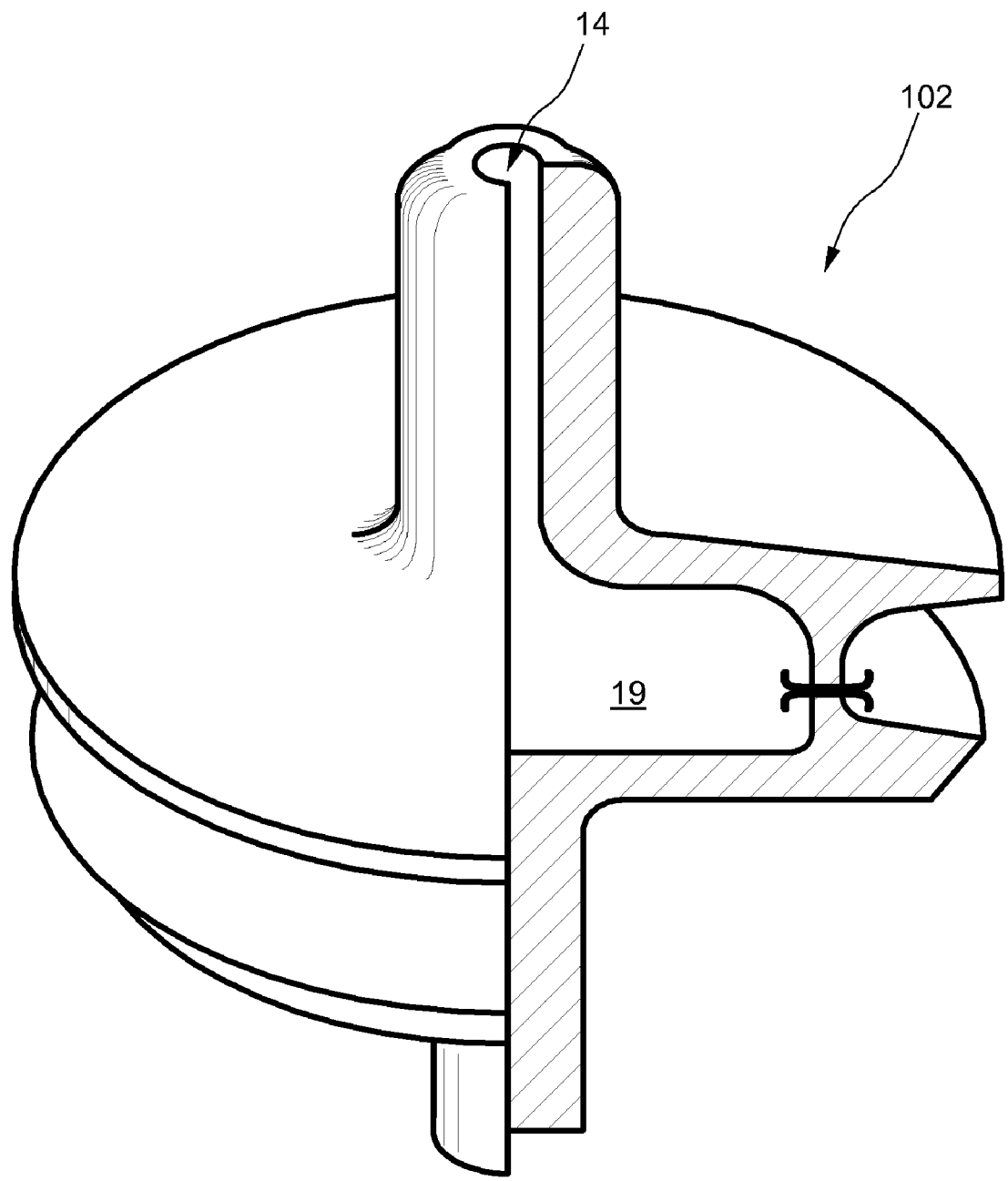
FIG. 5B illustrates a schematic view with partial cross-section of an alternative embodiment of the valve body shown in FIG. 5A; the illustrated hollow is not totally enclosed but instead has fluid communication with space external to the valve body.

Note that although hollow 13 is shown totally enclosed by portions 20 and 30 and weld 15', communication between space external to valve body 10' and an interior hollow may exist in other embodiments as schematically illustrated by the example in FIG. 5B.

The view of valve body 101 in FIG. 5A schematically illustrates opposing walls 21 and 31 of seal retention groove 111 after machining to final shape. Junction 15' is part of cylindrical web 16, but its accompanying welding flash 89 is not finish machined at all in the otherwise finish machined valve body 101 in FIG. 5A. Instead, the welding flash 89 remains extruded into seal retention groove 111 and hollow 13. When the embodiment of FIG. 5A is to be produced, opposing wall 31 of seal retention groove 111 is preferably finish machined before joining of portions 20 and 30. The continued presence of welding flash 89 in groove 111 after joining would complicate any finish machining of opposing wall 31' that might be attempted after joining.

As schematically illustrated in FIG. 5A, welding flash 89 comprises a relatively small amount of exceptionally hard, rough metal, often of irregularly curled shape, that lies adjacent to mating surfaces after the surfaces are joined together by welding. Consequently, welding flash generally protrudes from the weld junction of portions 20 and 30 into the adjacent integral seal retention groove. Further, welding flash is relatively difficult to remove from the groove, even after heating of the valve body in an annealing furnace.

Figure 8C:
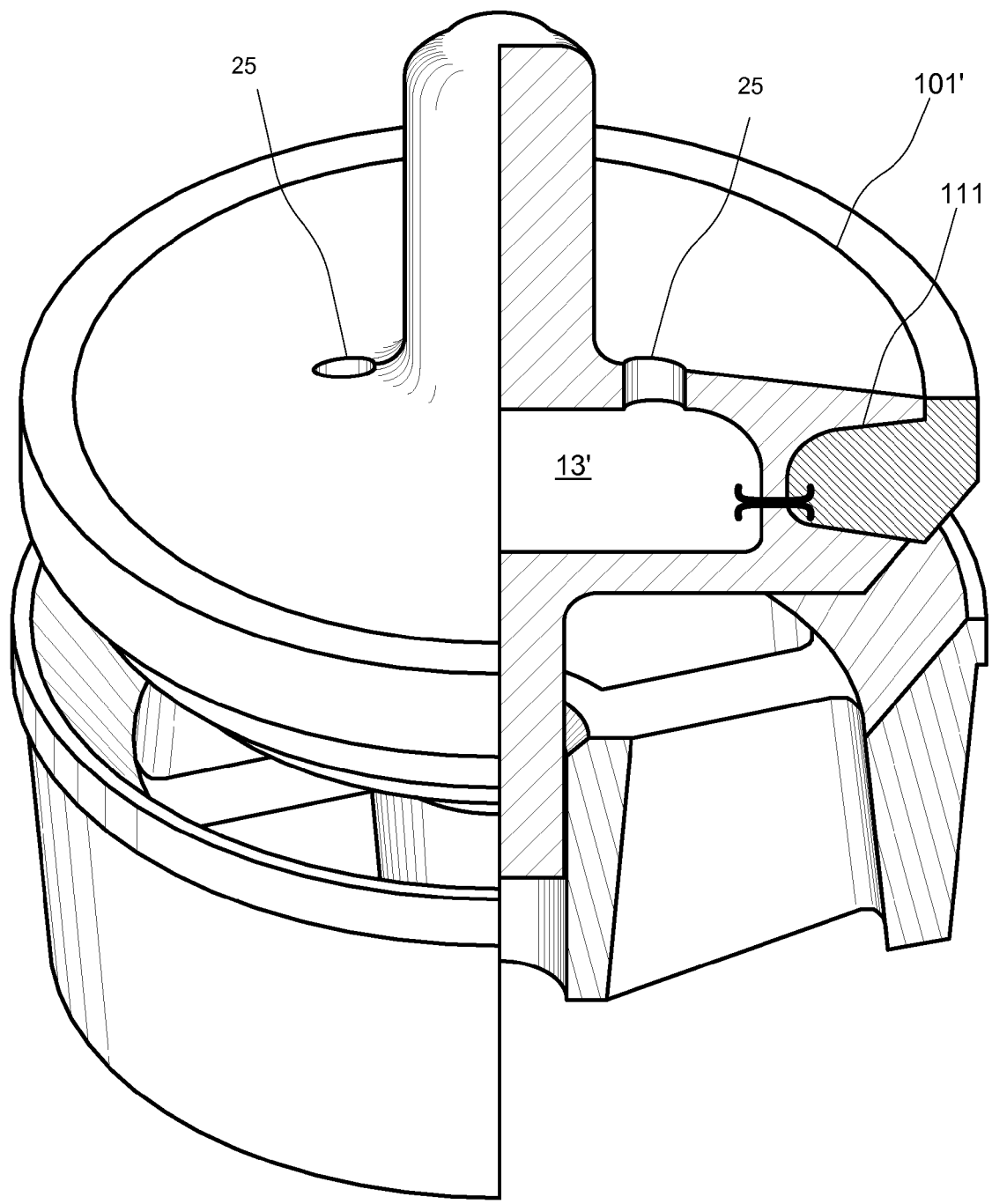
FIG. 8C schematically illustrates an arrangement of features analogous in part to that in FIG. 8A but with the presence of two fluid passages spaced apart from the valve body longitudinal axis.

The presence of welding flash in a peripheral integral seal retention groove increases the difficulty of properly fitting a snap-on elastomeric seal ring into the groove. Thus, for example, when valve body 101 is fitted with a single-durometer elastomeric seal 8 (as shown in FIG. 8A), or when valve body 400 is fitted with a dual-durometer elastomeric seal 415 (as shown in FIG. 10B), the respective elastomeric seals are preferably cast and cured in place internal to the respective seal retention grooves (i.e., seal retention groove 111 in FIG. 8A or seal retention groove 411 in FIG. 10B). The welding flash 89 that protrudes into seal retention groove 111, as in FIGS. 8A and 8C, is analogous to the welding flash 489 that protrudes into seal retention groove 411, as in FIG. 10B. In either case, the welding flash will simply be enveloped by elastomer(s) as a seal is being cast in place. After curing of the elastomeric seal, the welding flash will be tightly coupled to the seal elastomer(s) because of the irregular curled shape of the flash. Thus, the portion of the cured seal adjacent to the welding flash is firmly anchored internal to the seal retention groove. But because of the elastic properties of the seal elastomer, portions of the seal that are not adjacent to the welding flash may experience small relative movements of the seal with respect to the groove. These small movements (including small separations of the seal from the valve body) are limited by the seal's relatively tight coupling to the welding flash and also by the seal's generally sliding coupling to any serrations that may be present in certain embodiments. Such limitations on relative movement of a seal in its groove, in conjunction with internal stress relief in the seal elastomer provided via the movement, make leaks and/or premature seal failure less unlikely.

Valve body 102 in FIG. 5B is similar to valve body 101 as shown in FIG. 5A except for the presence of longitudinal fluid passage 14 which allows fluid communication between space external to valve body 102 and interior hollow 19. The presence of such communication is important, for example, to minimize differential pressure across a valve body and to allow hardening (e.g., by carburization) of both inner and outer surfaces of a valve body for increased wear resistance.

Regarding differential pressure across a valve body, the presence of a longitudinal fluid passage analogous to fluid passage 14 allows substantial equalization of fluid pressures internal to and external to a valve body. Absent such a longitudinal fluid passage, pressure external to a valve body during a pump pressure stroke would typically greatly exceed pressure internal to the valve body, tending to crush the valve body. The presence of a longitudinal fluid passage reduces or eliminates this periodic crushing tendency, thus maintaining valve body strength by minimizing a cyclic stress associated with metal fatigue.

Valve body strength may also be maintained or augmented by carburization of both inner and outer valve body surfaces. Carburized metal is harder but less ductile compared to metal that is not carburized. Carburizing involves infusing gaseous carbon into valve body surfaces over several hours in a furnace. The valve bodies are then quenched and tempered to produce a very hard and wear-resistant case on surfaces exposed to carburizing furnace gases. The hardened case is strong and relatively brittle, but the metal underlying the hardened case remains more ductile and therefore better able to resist fatigue cracking.

Figure 6:
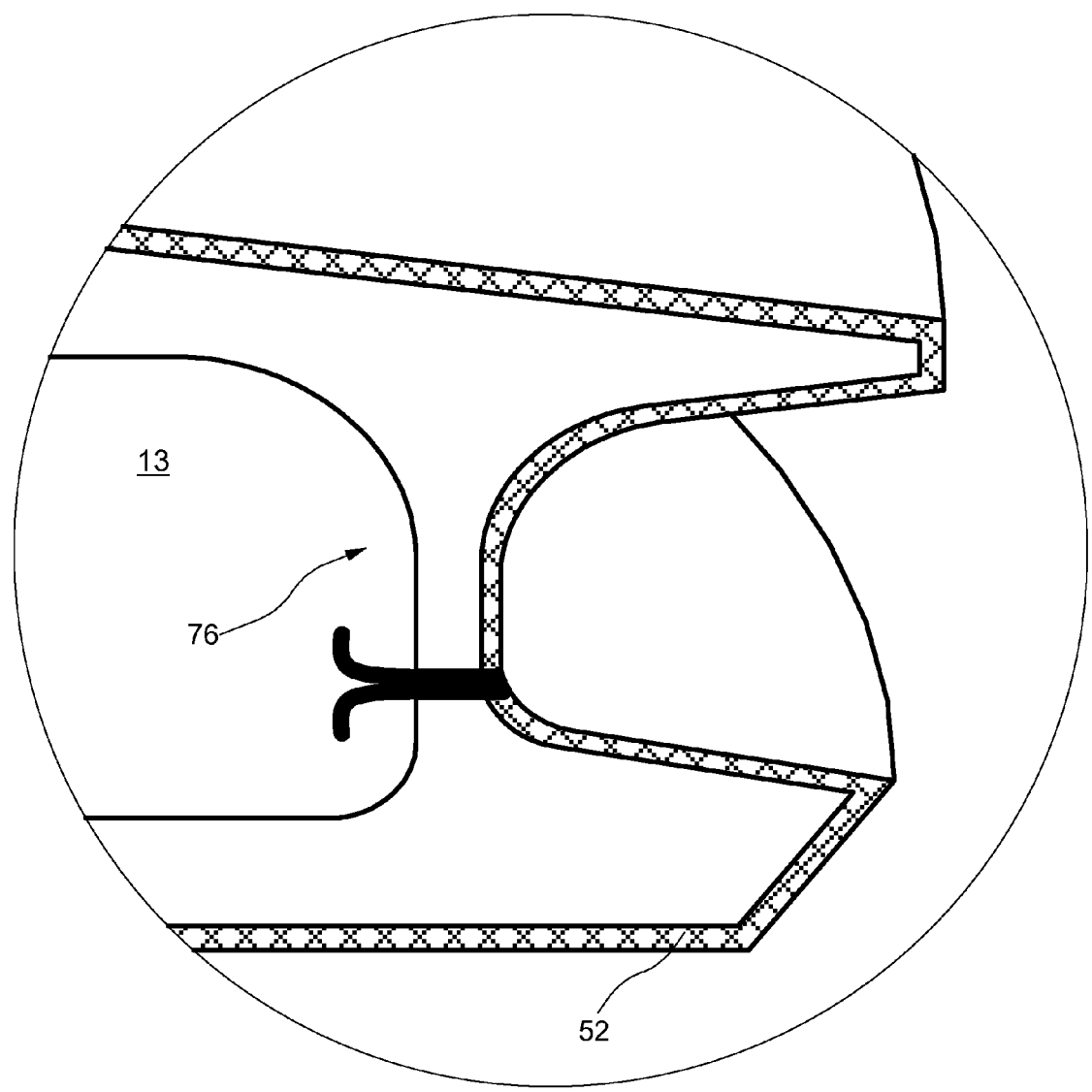
FIG. 6 schematically illustrates effects of carburization on surfaces of a valve body having a totally enclosed hollow.

During heat treatment of valve body 10 as shown in FIG. 1, carburization of interior surfaces of the totally-enclosed hollow 13 will not take place due to the absence of fluid communication between hollow 13 and space external to the valve body, including the gaseous carburizing agents in the heat treating furnace. In such a valve body, carburization will be limited to exterior valve body surfaces as schematically indicated by the crosshatched (carburized case) surface layer 52 in FIG. 6. Note that web 76 is carburized on one side only and that there is no welding flash protruding from the right side of web 76 into the seal retention groove, in contrast to the welding flash protruding from the left side of web 76 into hollow 13. The seal retention groove is thus configured to accept a snap-on elastomeric seal.

Figure 7:
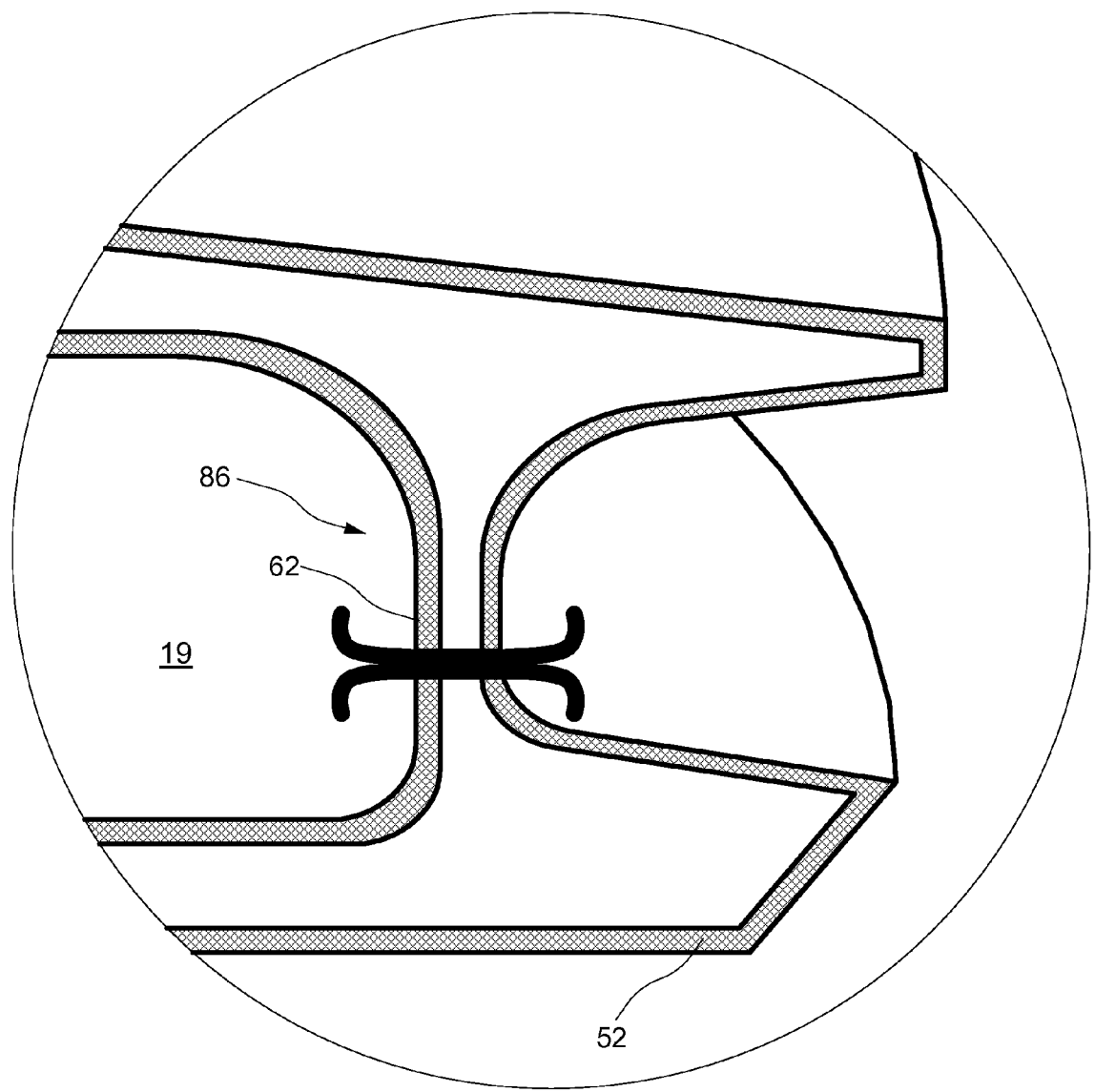
FIG. 7 schematically illustrates effects of carburization on surfaces of a valve body enclosing a hollow, wherein the hollow has fluid communication with space external to the valve body.

Conversely, carburization of valve body 102 as shown in FIG. 5B will result in carburization of interior surfaces bordering hollow 19 and longitudinal fluid passage 14. This condition is schematically illustrated in FIG. 7 wherein both an internal carburized surface layer 62 and an external carburized layer 52 are present on web 86. Note that one difference between hollow 13 in FIG. 6 and hollow 19 in FIG. 7 is the presence of internal carburized surface layer 62 enclosing hollow 19, whereas there is no such carburized layer enclosing hollow 13. Note also that welding flash 89 protrudes from the right side of web 86 into the seal retention groove, meaning that this embodiment is adapted for use with an elastomeric seal which is cast and cured in place in the seal retention groove.

In valve bodies where a cylindrical web may be carburized on one surface only (see, for example, the outer surface of web 76 in FIG. 6) or two surfaces (see, for example, the interior and outer surfaces of web 86 in FIG. 7), sufficient web thickness is provided to result in a minimum acceptable ratio of ductile metal thickness to carburized case depth of about 1:1. Note that two-surface carburization of web 86 as in FIG. 7 may be desirable for certain high-stress applications because the web 86 will have a "sandwich" structure with ductile metal serving to space apart two harder surface layers, imparting substantial resistance to crushing of the web 86 in axial compression. Where such crushing resistance is not required, one-sided carburization of the web 76 as in FIG. 6 may be used to avoid the extra cost of drilling or otherwise forming fluid passages analogous to longitudinal passage 14 in FIG. 5B.

Valve bodies of the invention are normally carburized to an effective case depth of about 0.06 to 0.08 inches. Carburization raises the carbon content of the valve body material, which for mild steel is initially about 0.2%. At valve body surfaces exposed to carburizing furnace gases, the carbon content of mild steel is preferably raised to about 1%. This level of carbon content decreases at deeper levels of the steel below the exposed valve body surfaces. Given a surface carbon content of about 1%, the depth into the steel underlying the exposed surface at which the carbon content decreases to about 0.5% is, by industry convention, called the effective case depth. In practice, the effective case depth would not be exactly constant over a heat treated valve body but would vary approximately ±10% about a set point due to manufacturing tolerances inherent in presently available carburizing furnaces. Hence, thicknesses specified for cylindrical webs in valve bodies of the invention are not exact values but instead reflect design objectives achieved through close control of variables in the carburizing process.

For the relatively small loads exerted on a cylindrical web in valve bodies of the invention, a minimum thickness of relatively ductile metal (i.e., metal not carburized to a carbon content greater than 0.5%) is equal to or greater than the greatest effective case depth measured on either side of the web. Therefore, assuming a one-sided carburization effective case depth of about 0.08 inches, the minimum thickness for cylindrical web 76 in a valve body having a totally enclosed interior hollow (and thus carburization on only one side of the web) will be about 0.16 inches. In contrast, assuming a carburization effective case depth of about 0.08 inches on each of two sides, the minimum thickness for cylindrical web 86 in a valve body having fluid communication between an interior hollow and space external to the valve body (and thus carburization on both sides of the web) will be approximately 0.24 inches (0.08 inches for the interior case thickness, plus 0.08 inches for the ductile core thickness, plus 0.08 inches for the exterior case thickness).

While minimum cylindrical web thickness is limited as described above, maximum web thickness is limited by the capacity of the apparatus used to join the portions of the valve body together (as, for example, by frictional or electron beam or electric arc welding). When using commercially available frictional welders having inertia wheels to join valve body portions, the practical upper limit on cylindrical boss wall thickness at the cylindrical boss mating surface in API size 7 valves is about 0.5 inches. Using frictional welders of larger capacity (or certain electric arc or electron beam welders) would allow this upper wall thickness limit to be raised.

FIG. 8A schematically illustrates a valve 90 comprising a 4-web seat 79 and a valve body and seal assembly 105. Valve body 101 comprises a totally enclosed hollow 13, guide stems 27 and 37, an insert seal retention groove 111 into which welding flash 89 protrudes. Elastomeric seal 8 is preferably cast and cured in place in seal retention groove 111 over welding flash 89 to reduce the incidence of seal leakage and out-of-round problems. FIG. 8C is similar to FIG. 8A in several respects, but differs in that valve body 101' comprises a hollow 13' which is not totally enclosed due to the presence of two fluid passages 25, which are spaced equally apart from, and symmetrically about, the longitudinal axis about which valve body 101' is substantially symmetrical. Thus, internal portions of hollow 13' may be beneficially carburized if these portions comprise carburizing steel.

Figure 9:
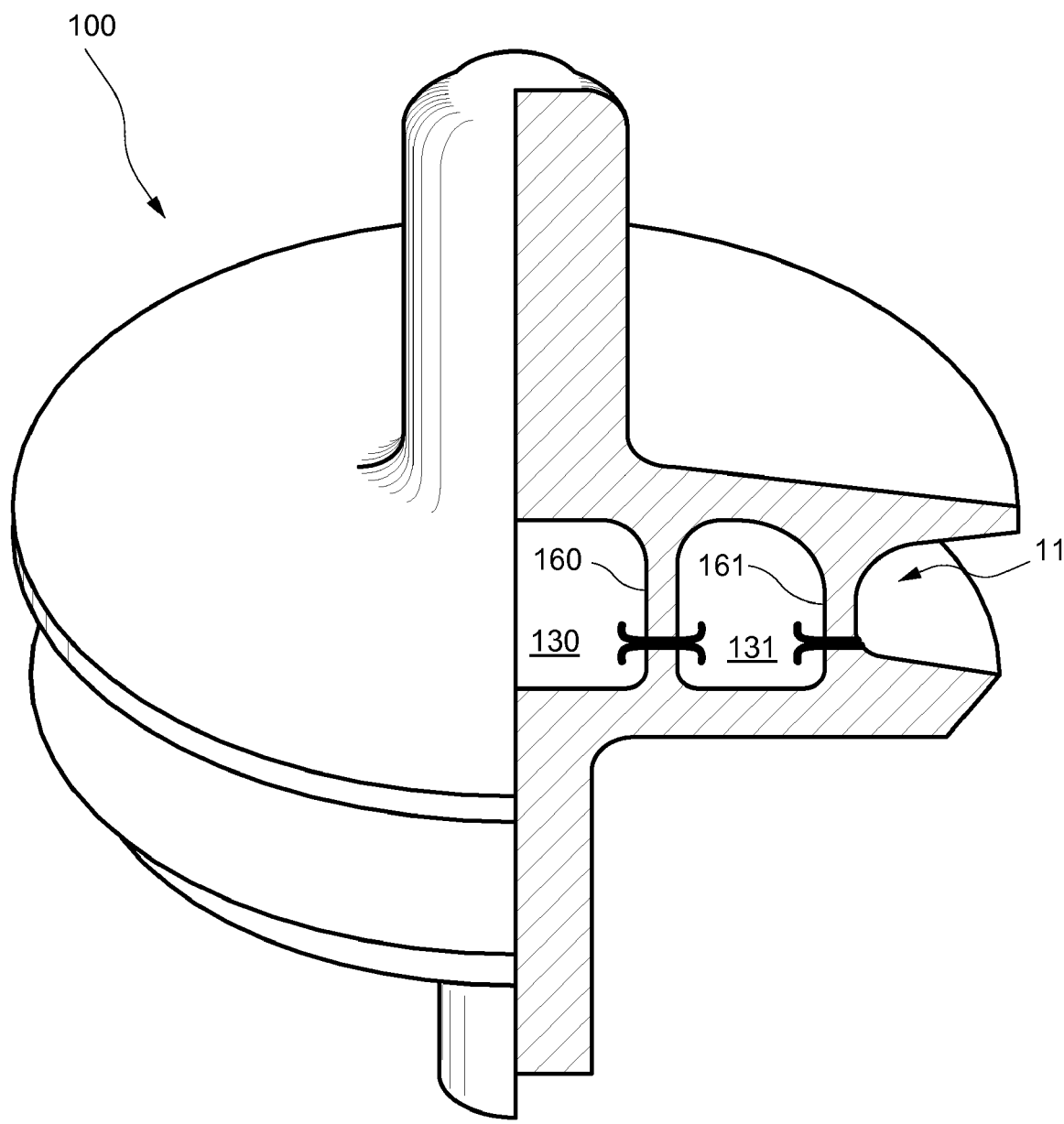
FIG. 9 illustrates a schematic view with partial cross-section of a valve body for use in web-seat, stem-guided valves; the valve body totally encloses a toroidal hollow and a concentric cylindrical hollow.

FIG. 9 schematically illustrates a schematic view with partial cross-section of valve body 100, which has the general outward appearance of valve body 10 in FIG. 1 but a different internal structure. The internal structure of valve body 100 comprises two concentric cylindrical webs, 160 and 161, a toroidal hollow 131, and a cylindrical hollow 130. Cylindrical webs 160 and 161 act as the webs of a box beam, as described above, to impart additional resistance to distortion about radial of valve body 100. Note that seal retention groove 11 in valve body 100 is smoothly finished (i.e., no welding flash protruding into the groove) and thus configured to accept a snap-on elastomeric seal.

Figure 10A:
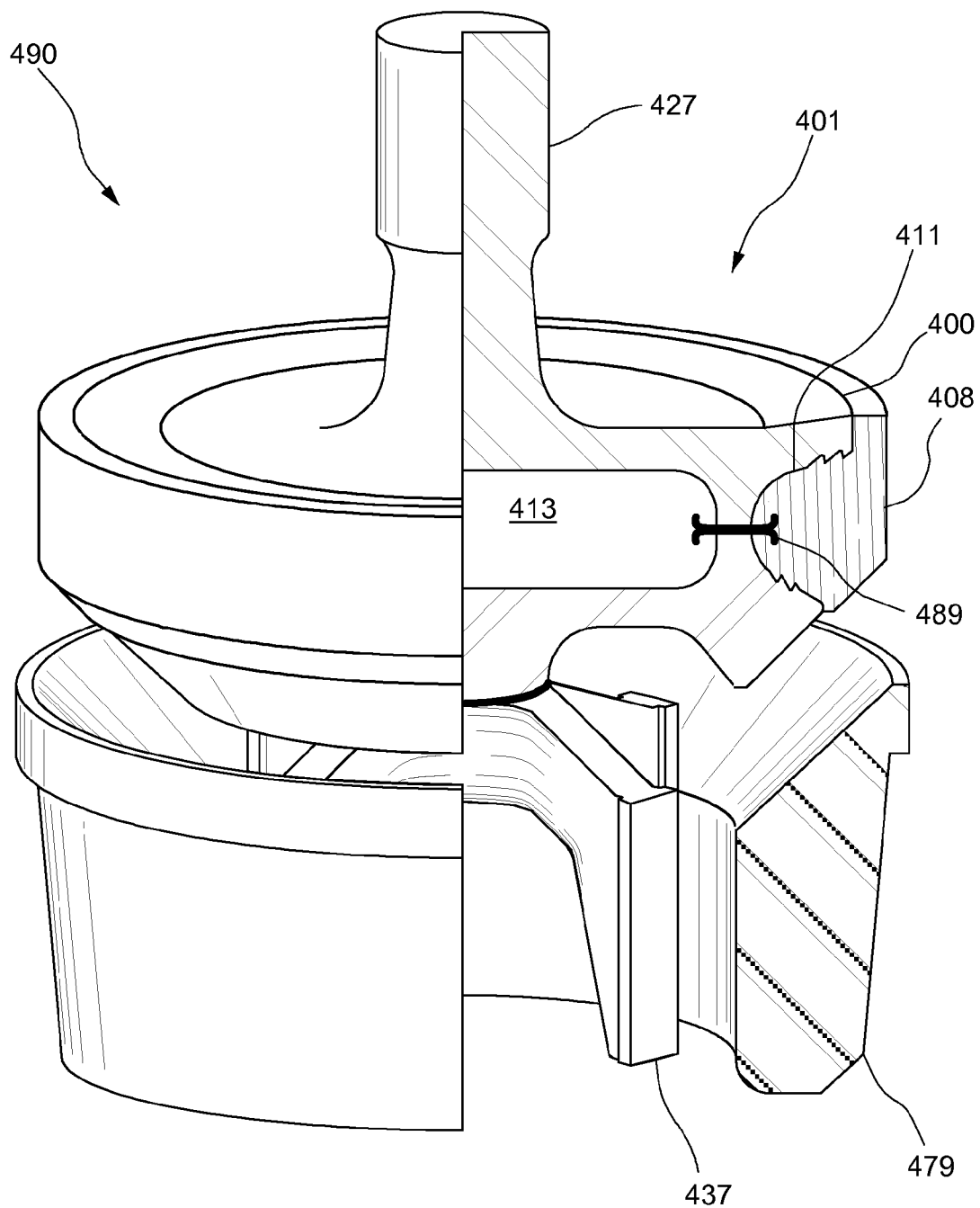
FIG. 10A schematically illustrates a partial cross-section of a valve comprising a valve body and seal assembly and a full-open valve seat, the valve body having a top guide stem and a bottom crow-foot guide. A single-durometer elastomeric seal is shown cast-in-place internal to the peripheral integral seal retention groove of the valve body.
Figure 10B:
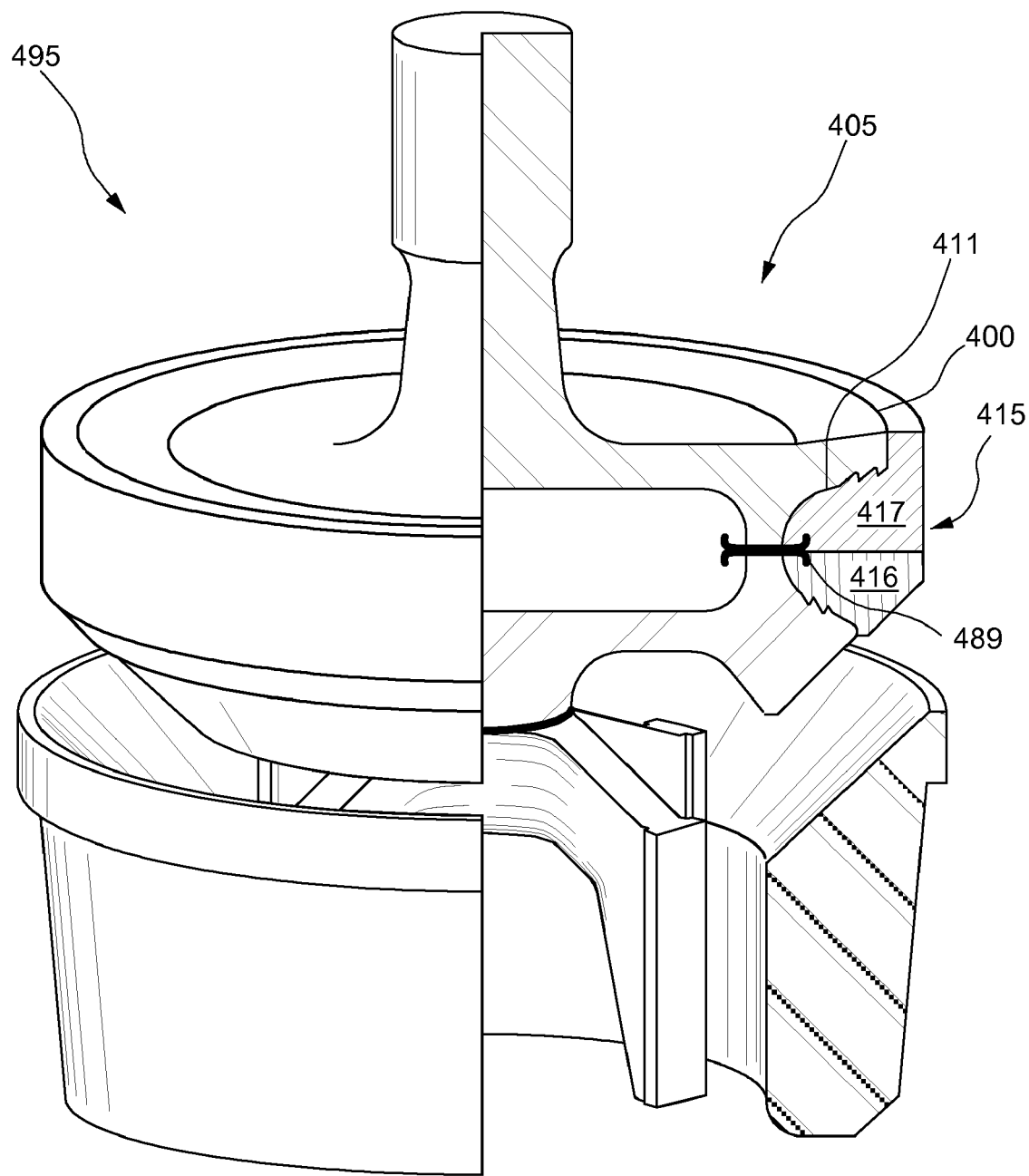
FIG. 10B schematically illustrates a partial cross-section of a valve comprising a valve body and seal assembly resembling that in FIG. 10A in certain respects but having a dual-durometer elastomeric seal cast-in-place internal to the peripheral integral seal retention groove of the valve body.

FIG. 10A schematically illustrates a valve 490 comprising a valve body and seal assembly 401 and a full-open seat 479. Valve body and seal assembly 401 comprises valve body 400 and a single-durometer cast-in-place elastomeric seal 408. Valve body 400 has a totally enclosed hollow 413, a top guide stem 427, a bottom crow-foot guide 437, and a peripheral integral seal retention groove 411 into which welding flash 489 protrudes. Seal 408 is cast and cured in place in seal retention groove 411 over welding flash 489 to reduce the incidence of seal leakage and out-of-round problems.

Figure 10C:
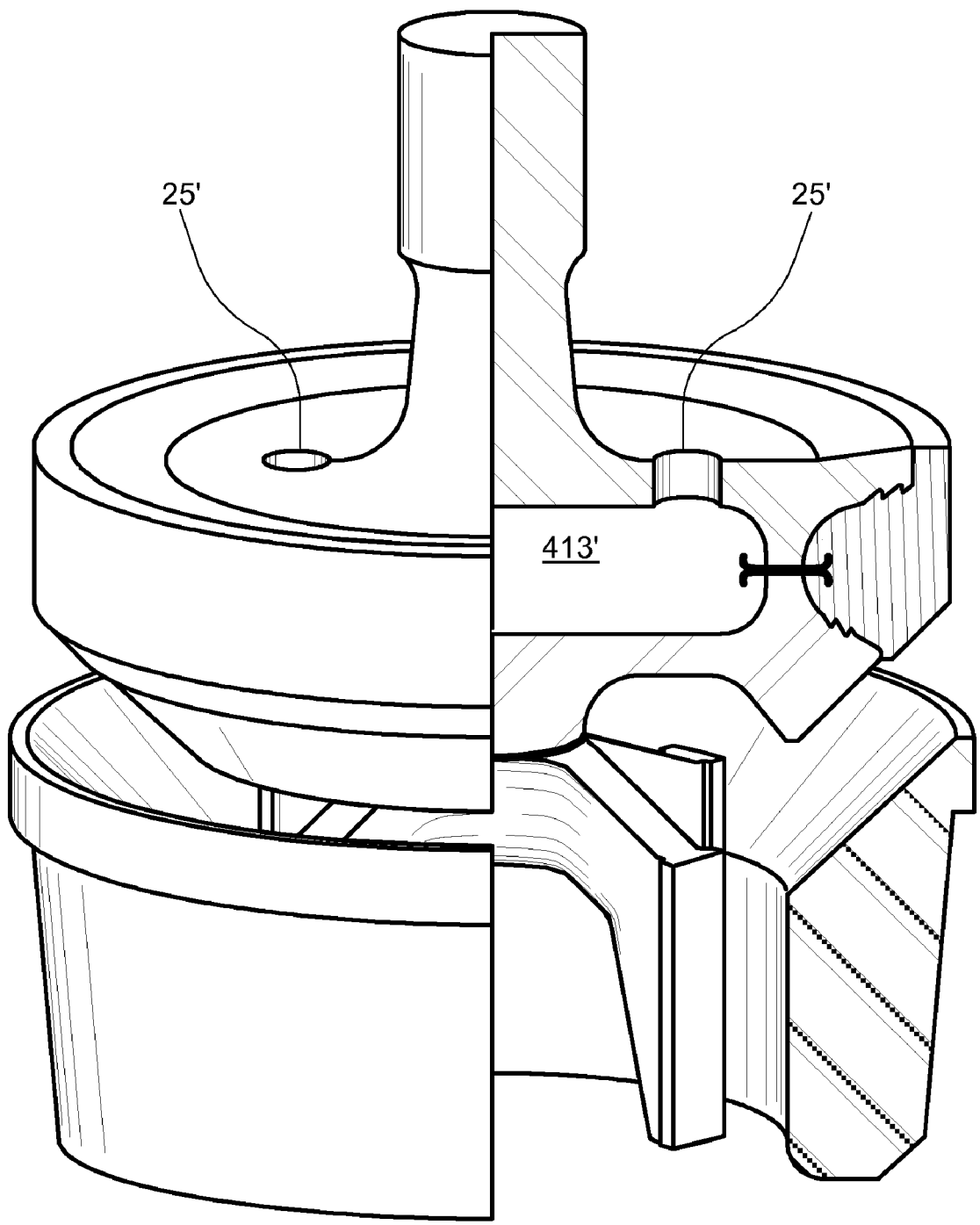
FIG. 10C schematically illustrates an arrangement of features analogous in part to that in FIG. 10A but with the presence of two fluid passages spaced apart from the valve body longitudinal axis.

FIG. 10C schematically illustrates an arrangement of features analogous in part to that in FIG. 10A but with the presence of two fluid passages 25' spaced equally apart from the valve body longitudinal axis. The presence of the two fluid passages 25' means that hollow 413' in FIG. 10C is not totally enclosed, whereas, hollow 413 in FIG. 10A is totally enclosed. Thus, internal portions of hollow 413' may be beneficially carburized if these portions comprise carburizing steel. Additionally, the symmetrical arrangement of the two fluid passages 25' allows the temporary positioning of an inertial element having a corresponding pair of drive pins (as for friction welding) without reliance on other valve body structures.

FIG. 10B schematically illustrates a valve 495 comprising a valve body and seal assembly 405 resembling valve body and seal assembly 401 in FIG. 10A in certain respects but comprising a dual-durometer elastomeric seal 415 cast-in-place internal to peripheral integral seal retention groove 411 into which welding flash 489 protrudes. Seal 415 is cast and cured in place in two portions 416 and 417 internal to seal retention groove 411, portions 416 and 417 each contacting welding flash 489 to reduce the incidence of seal leakage and out-of-round problems.

Figure 11A:
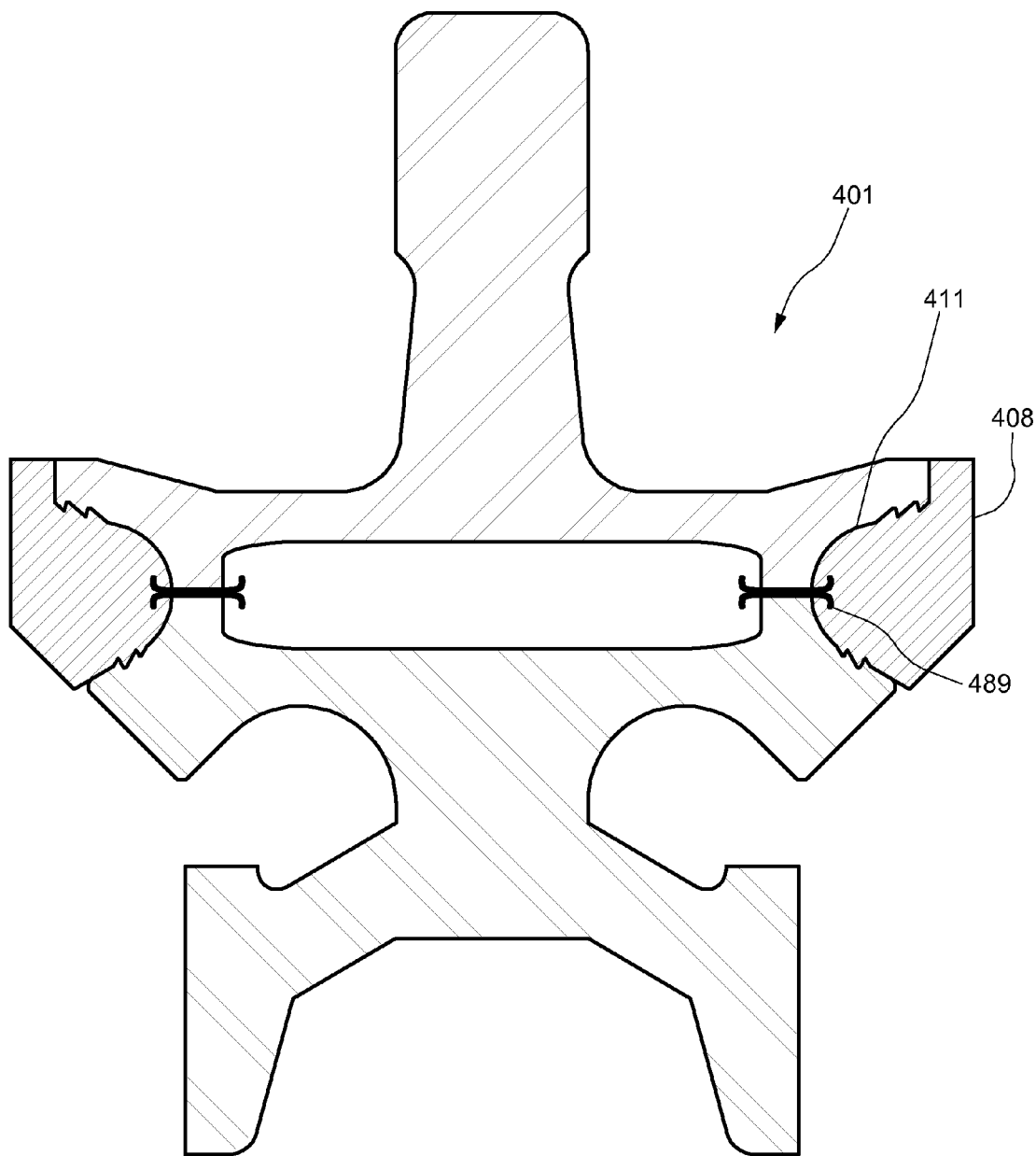
FIG. 11A schematically illustrates a cross-section of the valve body and seal assembly with cast-in-place elastomeric seal seen in FIG. 10A.
Figure 11B:
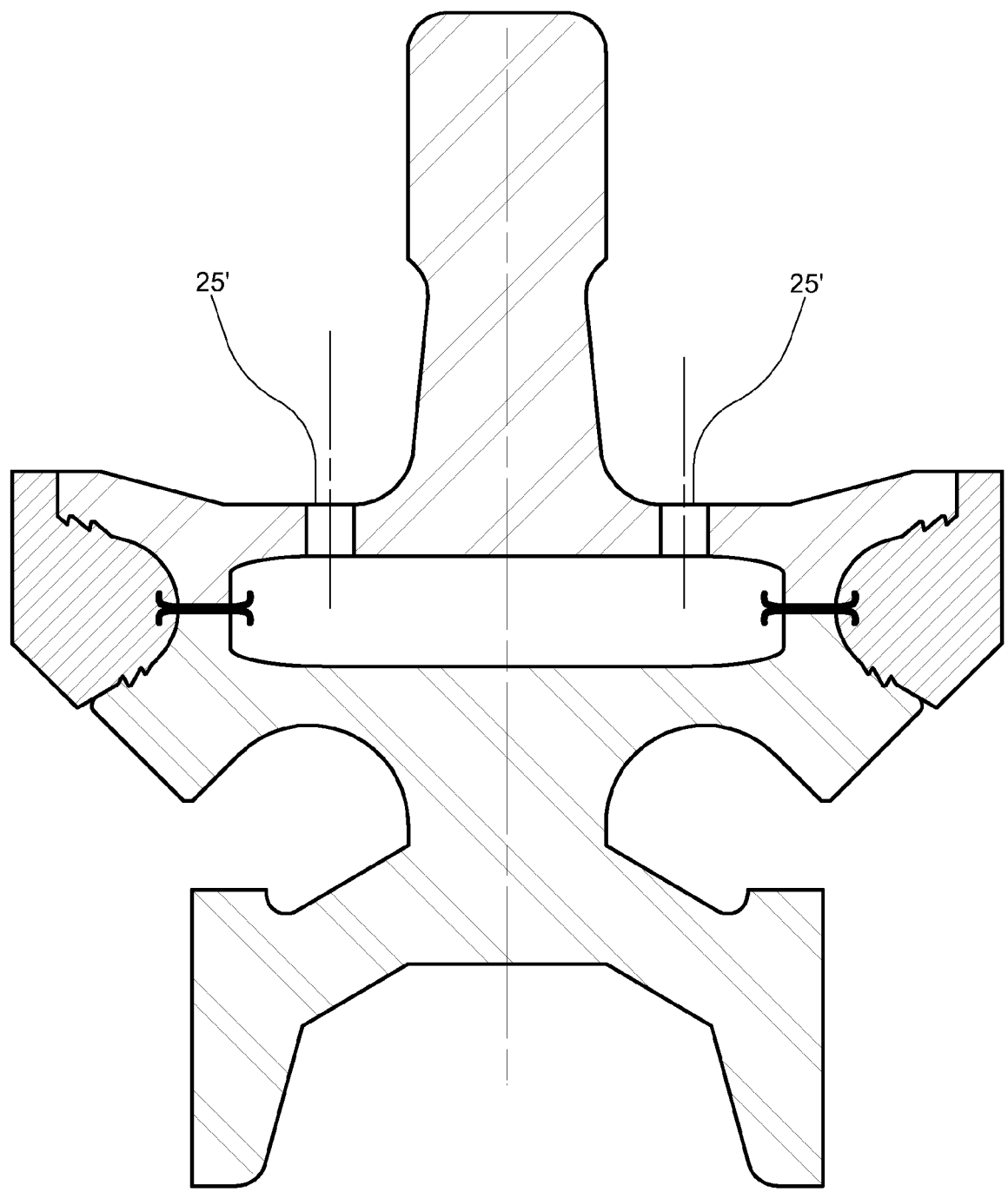
FIG. 11B schematically illustrates an arrangement of features analogous in part to that in FIG. 11A but with the presence of two fluid passages spaced apart from the valve body longitudinal axis.
Figure 11C:
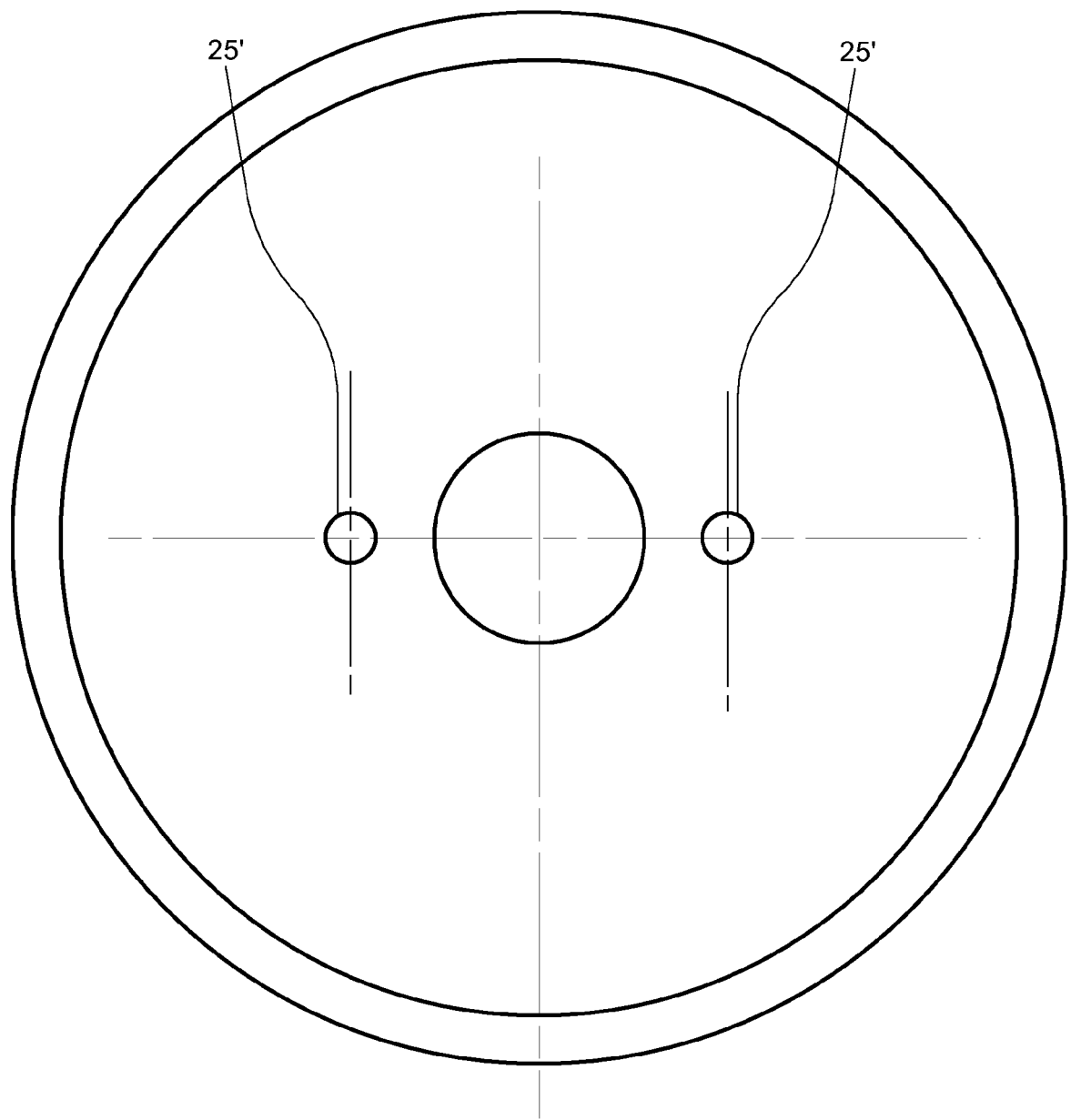
FIG. 11C schematically illustrates a plan view of the valve body and seal assembly of FIG. 11B.

FIG. 11A schematically illustrates a cross-sectional view of valve body and seal assembly 401 as seen in FIG. 10A. The symmetry of structures such as seal retention groove 411, welding flash 489, and seal 408 about the longitudinal axis of valve body and seal assembly 401 is shown. FIG. 11B schematically illustrates an arrangement of features analogous in part to that in FIG. 11A but with the presence of two fluid passages 25' symmetrically spaced apart from the valve body longitudinal axis. FIG. 11C schematically illustrates a plan view of the valve body and seal assembly of FIG. 11B that shows the symmetrical spacing of the two fluid passages 25' about the valve body longitudinal axis, the fluid passages facilitating internal carburization, pressure equalization, and inertial element placement as described herein.

Figure 12A:
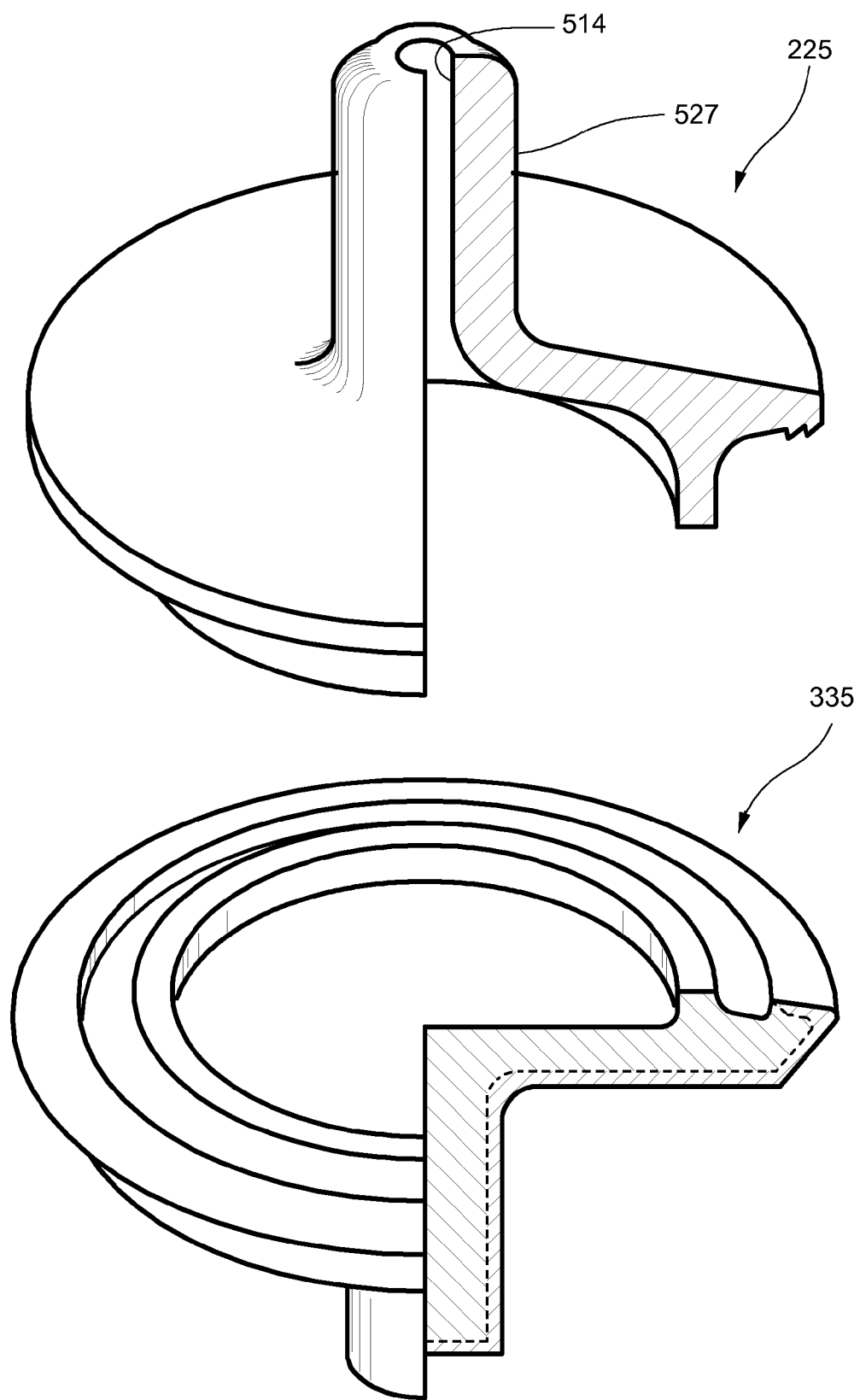
FIG. 12A schematically illustrates an exploded view with partial cross-sections showing an investment cast valve body portion that includes a top stem guide having a longitudinal fluid passage, together with a forged valve body portion (shown before machining).
Figure 12B:
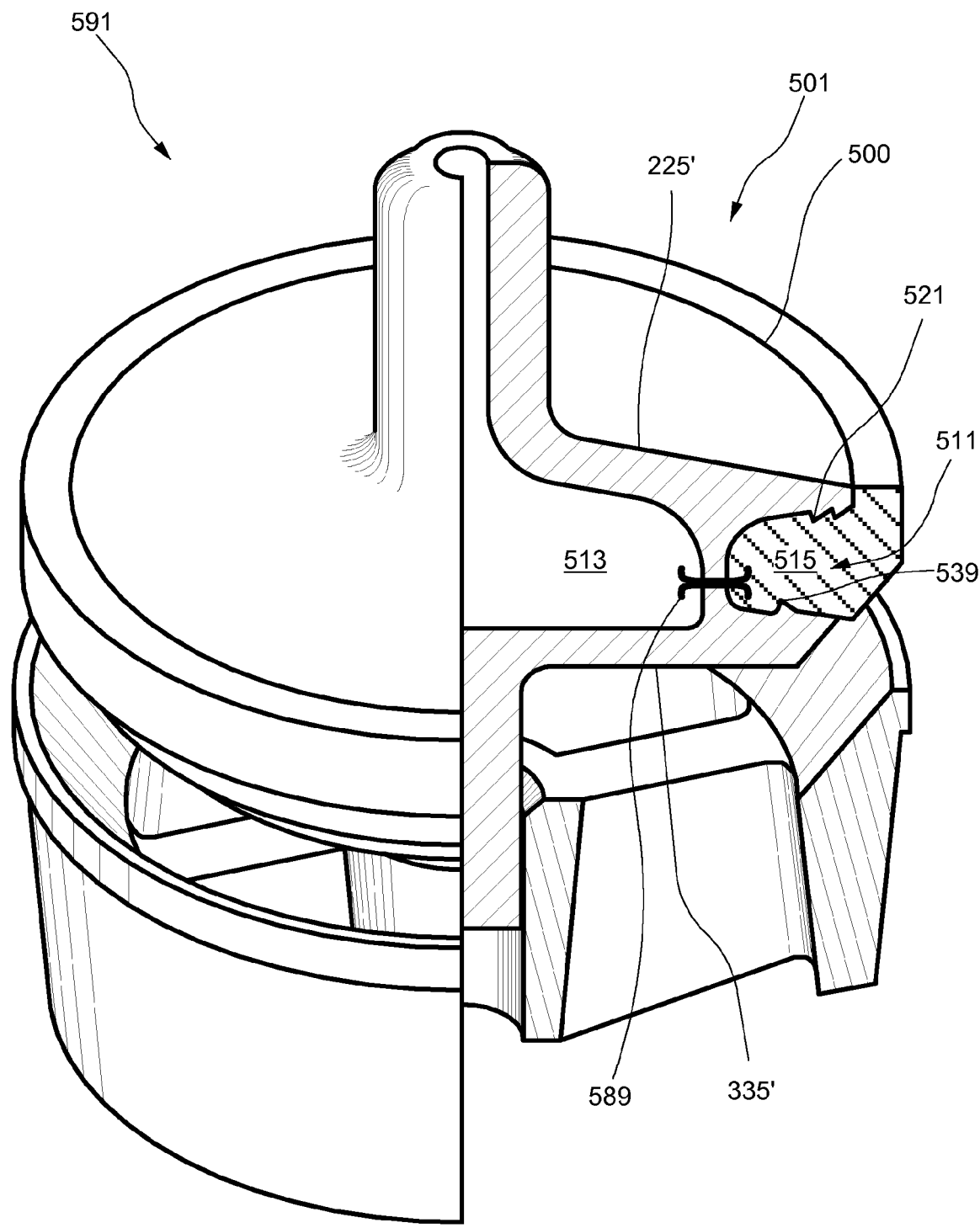
FIG. 12B schematically illustrates a valve that includes a valve seat and a valve body and seal assembly comprising a valve body formed by welding together the valve body portions shown in FIG. 12A, the valve body having a single-durometer elastomeric seal cast-in-place internal to the peripheral integral seal retention groove.

FIG. 12A schematically illustrates an exploded view with partial cross-sections showing an investment cast valve body portion 225 that includes a top stem guide 527 having a longitudinal fluid passage 514, together with a forged valve body portion 335 (shown before machining). FIG. 12B schematically illustrates a valve 591 that includes a valve body and seal assembly 501 comprising a valve body 500 formed by welding together the valve body portion 225 (see FIG. 12A) and a valve body portion machined from valve body portion 335 (along the dotted line seen in FIG. 12A). Note that after being welded together, the portions 225 and 335 shown separately in FIG. 12A have altered shapes which are identified in FIGS. 12B and 12D as 225' and 335' respectively. Welded valve body 500 has a single-durometer elastomeric seal 515 cast-in-place internal to peripheral integral seal retention groove 511, and welding flash 589 protrudes into groove 511. Note that serrations 521 have required no machining because their final shape was established by the investment casting of valve body portion 225. In contrast, the serration 539 was machined from the forged valve body portion 335 (see FIG. 12A).

Figure 12C:
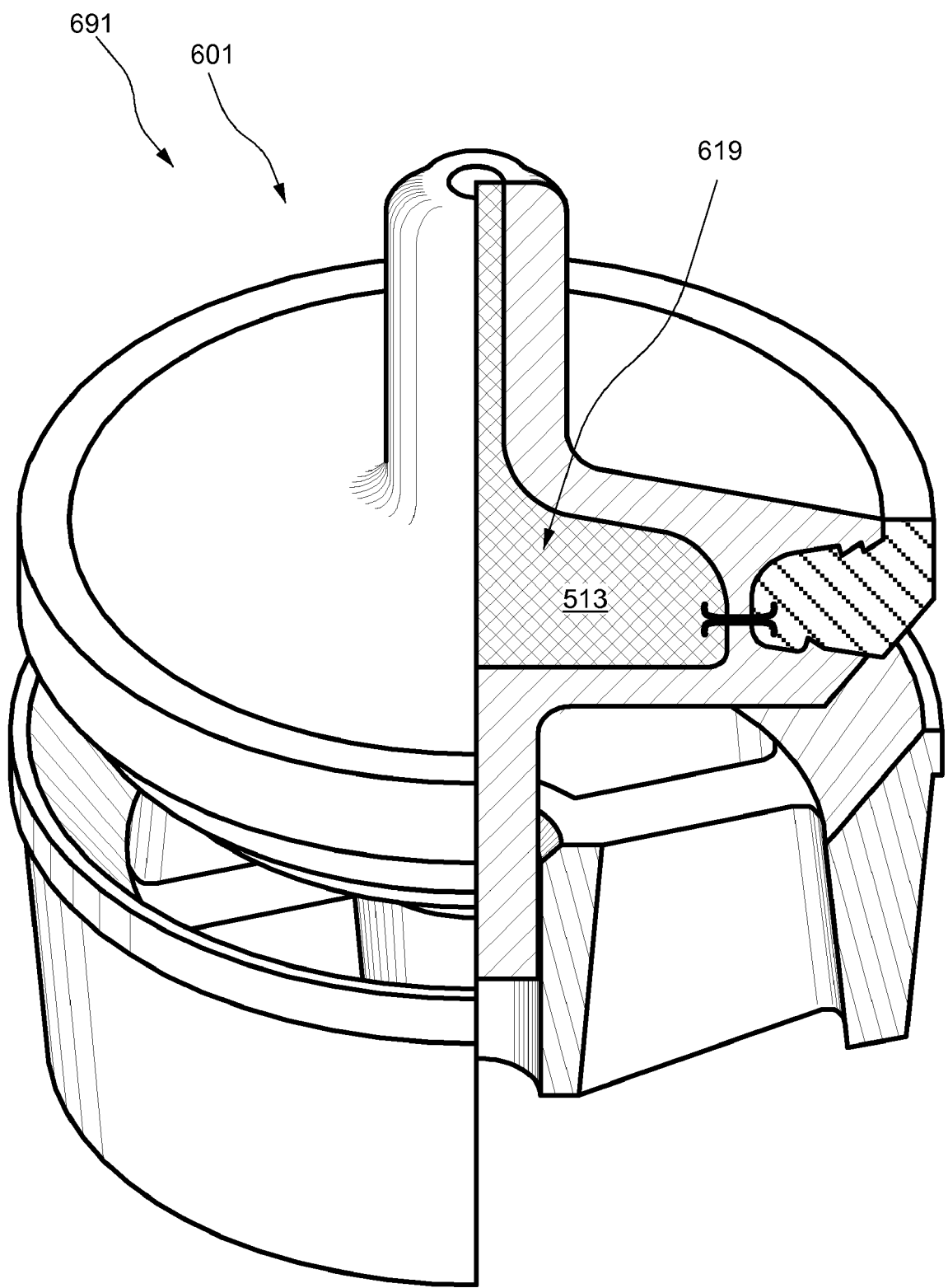
FIG. 12C schematically illustrates a valve that includes a valve seat and a valve body and seal assembly resembling that shown in FIG. 12B in certain respects but having an internal space filled with a substantially incompressible flowable substance.

FIG. 12C schematically illustrates a valve 691 that includes a valve body and seal assembly 601 resembling valve body and seal assembly 501 (see FIG. 12B) in certain respects but having internal space 513 (see FIG. 12B) filled with a substantially incompressible flowable substance. 619.

Figure 12D:
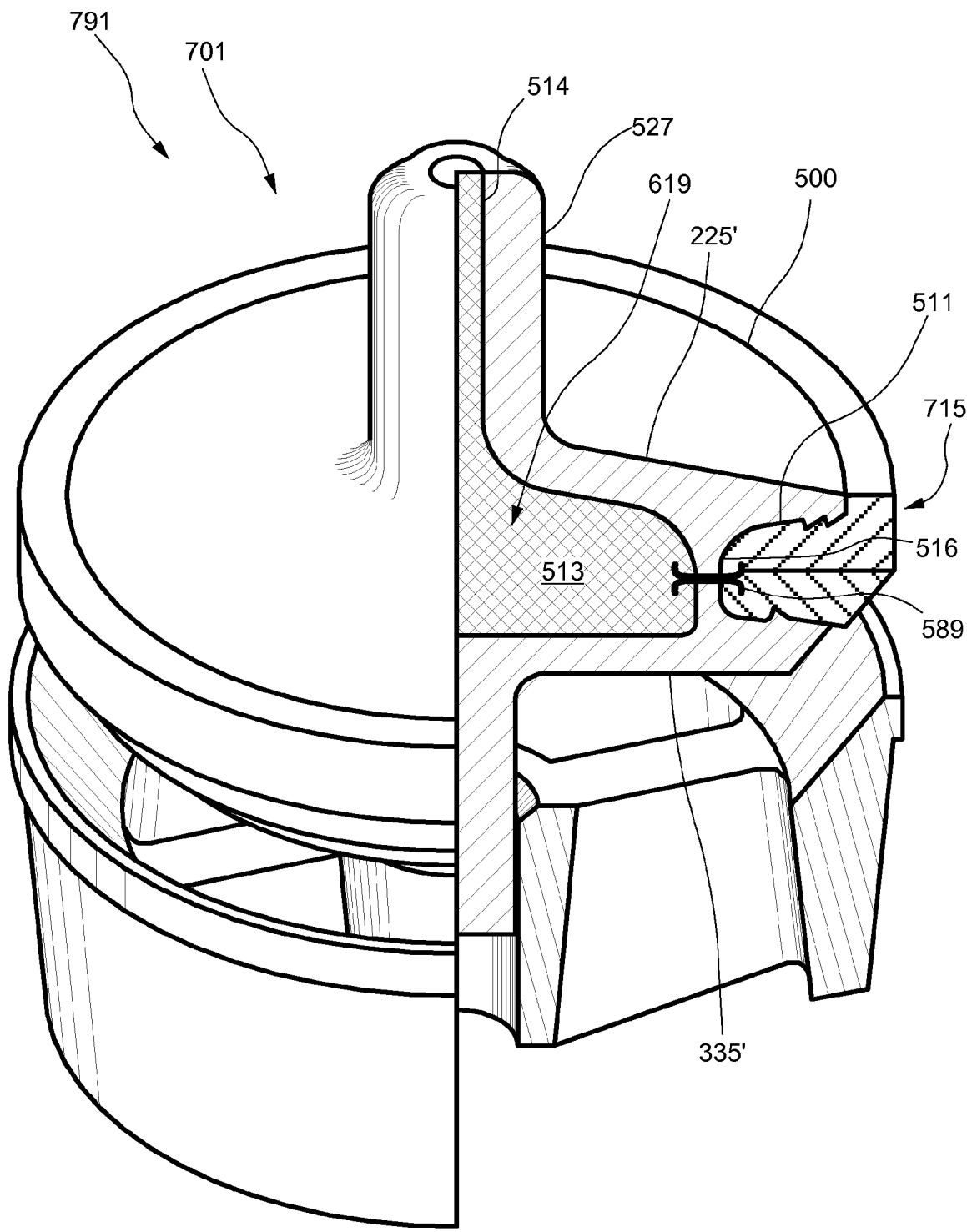
FIG. 12D schematically illustrates a valve that includes a valve seat and a valve body and seal assembly resembling that shown in FIG. 12C in certain respects but having a dual-durometer elastomeric seal cast-in-place internal to the peripheral integral seal retention groove of the valve body.

FIG. 12D schematically illustrates a valve 791 that includes a valve body and seal assembly 701 resembling valve body and seal assembly 601 shown in FIG. 12C in certain respects but having a dual-durometer elastomeric seal 715 cast-in-place internal to peripheral integral seal retention groove 511 of welded valve body 500. Valve body and seal assemblies 601 and 701 are formed by welding together the first valve body portion 225 (see FIG. 12A) and a second valve body portion machined (as indicated by the dotted line in FIG. 12A) from valve body portion 335. The first valve body portion in the welded valve body 500 (identified as portion 225') is symmetrical about a first longitudinal axis and comprises a valve body guide stem 527 extending along the first longitudinal axis, valve body guide stem 527 having a centrally-located longitudinal fluid passage 514. The second valve body portion in the welded valve body 500 (identified as portion 335') is symmetrical about a second longitudinal axis, and the first and second longitudinal axes are colinear and form a common longitudinal axis.

A cylindrical web 516 is formed by welding the first valve body portion 225' to the second valve body portion 335', cylindrical web 516 being radially spaced apart from and symmetrically disposed about the common longitudinal axis. Cylindrical web 516 peripherally encloses a space 513 internal to valve body and seal assembly 701. A peripheral seal retention groove 511 is formed by peripheral portions of the first and second valve body portions 225' and 335' respectively and the cylindrical web 516. Welding flash 589 protrudes into peripheral seal retention groove 511, and an elastomeric seal (shown as a dual-durometer elastomeric seal 715) is cast-in-place in groove 511. The space 513 internal to the valve body and seal assembly 701 communicates with space external to valve body and seal assembly 701 via longitudinal fluid passage 514, and the space 513 internal to valve body and seal assembly 701 is substantially occupied by a flowable substance 619 that is substantially incompressible.

The present invention includes a method for facilitating equalization of pressures in spaces internal to and external to a valve body. The method comprises two steps, the first step being providing at least one fluid passage (see, e.g., longitudinal fluid passage 514) communicating with spaces internal to and external to the valve body (see, e.g., valve body 500). The second step is providing a flowable and substantially incompressible substance (see, e.g., flowable substance 619) to substantially occupy the space internal to the valve body (see e.g., space 513) for facilitating equalization of pressures in spaces internal to and external to the valve body as described herein.

What is claimed is:

1. A valve body comprising:

top and bottom valve body portions, each said valve body portion being substantially symmetrical about a longitudinal axis;

guide means extending from at least one said valve body portion, said guide means comprising at least one longitudinal surface;

at least one cylindrical web connecting said top and bottom valve body portions, each said cylindrical web being radially spaced apart from and symmetrically disposed about said longitudinal axis, and each said cylindrical web peripherally enclosing at least one internal space internal to the valve body and seal assembly;

at least one fluid passage in said top valve body portion, at least one said fluid passage being spaced apart from said longitudinal axis and facilitating fluid communication between at least one said internal space and space external to the valve body and seal assembly; and a peripheral seal retention groove comprising peripheral portions of said top and bottom valve body portions and at least a portion of one said cylindrical web.

2. The valve body of claim 1 wherein at least one said internal space is substantially occupied by a flowable substance.

3. The valve body of claim 2 wherein said flowable substance is substantially incompressible.

4. The valve body of claim 1 wherein said top and bottom valve body portions comprise carburizing steel.

5. The valve body of claim 4 wherein said bottom valve body portion comprises relatively higher alloy steel compared to said top valve body portion.

6. The valve body of claim 1 wherein said guide means comprises a guide stem extending from said top valve body portion.

7. The valve body of claim 1 additionally comprising an elastomeric seal in said peripheral seal retention groove.

8. A valve body comprising:

top and bottom valve body portions, each said valve body portion being substantially symmetrical about a longitudinal axis;

guide means extending from at least one said valve body portion, said guide means comprising at least one longitudinal surface;

at least one cylindrical web connecting said top and bottom valve body portions, each said cylindrical web being radially spaced apart from and symmetrically disposed about said longitudinal axis, and each said cylindrical web peripherally enclosing at least one internal space internal to the valve body and seal assembly;

at least one fluid passage in said top valve body portion, at least one said fluid passage being spaced apart from said longitudinal axis and facilitating fluid communication between at least one said internal space and space external to the valve body and seal assembly; and a peripheral seal retention groove comprising peripheral portions of said top and bottom valve body portions and at least a portion of one said cylindrical web;

wherein said first and second valve body portions comprise carburizing steel.

9. The valve body of claim 8 wherein at least one said internal space is substantially occupied by a flowable substance.

10. The valve body of claim 9 wherein said flowable substance is substantially incompressible.

11. The valve body of claim 10 wherein said flowable substance comprises a polymer.

12. The valve body of claim 8 wherein said bottom valve body portion comprises relatively higher alloy steel compared to said top valve body portion.

13. The valve body of claim 8 wherein said guide means comprises a guide stem extending from said top valve body portion.

14. The valve body of claim 13 wherein said guide means additionally comprises a guide stem extending from said bottom valve body portion.

* * * * *